United States Patent
Akiyama

(10) Patent No.: US 8,895,345 B2
(45) Date of Patent: Nov. 25, 2014

(54) DICING METHODS

(75) Inventor: Takanobu Akiyama, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 231 days.

(21) Appl. No.: 13/159,192

(22) Filed: Jun. 13, 2011

(65) Prior Publication Data

US 2011/0318877 A1 Dec. 29, 2011

(30) Foreign Application Priority Data

Jun. 24, 2010 (JP) ................. 2010-144223
Apr. 18, 2011 (JP) ................. 2011-091811

(51) Int. Cl.
*H01L 21/00* (2006.01)
*B23K 26/08* (2014.01)
*B28D 5/00* (2006.01)
*B23K 26/00* (2014.01)
*B23K 26/30* (2014.01)
*B23K 26/40* (2014.01)

(52) U.S. Cl.
CPC .......... *B23K 26/0807* (2013.01); *B28D 5/0005* (2013.01); *B23K 26/0057* (2013.01); *B23K 26/421* (2013.01); *B23K 26/409* (2013.01); *B23K 26/4075* (2013.01)
USPC .............. 438/68; 438/113; 438/114; 438/460; 438/462; 257/E21.57; 257/E21.599; 257/E21.6

(58) Field of Classification Search
USPC ........ 438/68, 113–114, 460, 462; 257/E21.6, 257/E21.517, E21.599
See application file for complete search history.

(56) References Cited

U.S. PATENT DOCUMENTS 3,985,597 A * 10/1976 Zielinski .................. 438/623
4,519,872 A    5/1985 Anderson
(Continued)

FOREIGN PATENT DOCUMENTS

CN    1347176    5/2002
CN    1700444    11/2005
(Continued)

OTHER PUBLICATIONS

Korean Office Action issued in KR 10-2011-0005848 Sep. 1, 2012.
(Continued)

*Primary Examiner* — Mohsen Ahmadi
(74) *Attorney, Agent, or Firm* — DLA Piper LLP (US)

(57) ABSTRACT

The present invention provides a dicing method that achieves excellent dicing properties at low costs by removing a metal film through a metal processing operation with a diamond tool and then performing pulse laser beam irradiation. The dicing method is a method of dicing a substrate to be processed, devices being formed in the substrate to be processed, a metal film being formed on one surface of the substrate to be processed. The dicing method includes: placing the substrate to be processed onto a first stage; forming a groove portion by removing the metal film through a metal processing operation with a diamond tool; placing the substrate to be processed onto a second stage; generating a clock signal; emitting a pulse laser beam synchronized with the clock signal to the groove portion of the substrate to be processed; moving the substrate to be processed and the pulse laser beam relative to each other; switching the pulse laser beam between irradiation and non-irradiation of the substrate to be processed on a light pulse basis by controlling passing and blocking of the pulse laser beam with a pulse picker in synchronization with the clock signal; and forming cracks in the substrate to be processed, the cracks reaching the substrate surface.

19 Claims, 27 Drawing Sheets

(56) References Cited

U.S. PATENT DOCUMENTS

| | | | |
|---|---|---|---|
| 4,871,896 A | 10/1989 | Kempter et al. | |
| 4,970,546 A | 11/1990 | Suzuki | |
| 5,000,811 A * | 3/1991 | Campanelli | 156/264 |
| 5,041,716 A | 8/1991 | Wakabayashi | |
| 5,227,607 A | 7/1993 | Ishiyama | |
| 5,742,634 A | 4/1998 | Rieger et al. | |
| 6,215,095 B1 | 4/2001 | Partanen | |
| 7,205,501 B2 | 4/2007 | Arai et al. | |
| 7,284,396 B2 | 10/2007 | Barron | |
| 7,405,137 B2 | 7/2008 | Terayama et al. | |
| 7,982,160 B2 | 7/2011 | Baird | |
| 8,178,818 B2 | 5/2012 | Baird et al. | |
| 8,253,066 B2 | 8/2012 | Gu et al. | |
| 8,269,137 B2 | 9/2012 | Ehrmann et al. | |
| 2002/0115235 A1 | 8/2002 | Sawada | |
| 2002/0149136 A1 | 10/2002 | Baird | |
| 2004/0002199 A1 | 1/2004 | Fukuyo | |
| 2004/0134894 A1 | 7/2004 | Gu et al. | |
| 2005/0067392 A1 | 3/2005 | Nagai et al. | |
| 2005/0092720 A1 | 5/2005 | Gu et al. | |
| 2005/0181581 A1 | 8/2005 | Fukuyo | |
| 2006/0086704 A1 | 4/2006 | Nagai et al. | |
| 2006/0091126 A1 | 5/2006 | Baird et al. | |
| 2006/0092990 A1 | 5/2006 | Koga et al. | |
| 2006/0102601 A1 | 5/2006 | Shirk et al. | |
| 2006/0119691 A1 | 6/2006 | Shigematsu | |
| 2006/0169677 A1 | 8/2006 | Deshi | |
| 2006/0191884 A1 | 8/2006 | Johnson et al. | |
| 2006/0223234 A1 * | 10/2006 | Terayama et al. | 438/113 |
| 2007/0007627 A1 | 1/2007 | Young | |
| 2007/0075063 A1 | 4/2007 | Wilbanks | |
| 2007/0170162 A1 | 7/2007 | Haupt | |
| 2007/0248136 A1 | 10/2007 | Leonardo | |
| 2008/0003708 A1 | 1/2008 | Hoshino | |
| 2008/0013163 A1 | 1/2008 | Leonardo | |
| 2008/0029491 A1 | 2/2008 | Johnson | |
| 2008/0057599 A1 | 3/2008 | Kobashi | |
| 2008/0179304 A1 | 7/2008 | Osako | |
| 2008/0204748 A1 | 8/2008 | Nomaru | |
| 2009/0004828 A1 | 1/2009 | Kobayashi | |
| 2009/0032510 A1 | 2/2009 | Ando | |
| 2009/0032511 A1 | 2/2009 | Adams et al. | |
| 2009/0081851 A1 | 3/2009 | Sakamoto et al. | |
| 2009/0095722 A1 | 4/2009 | Ehrmann et al. | |
| 2009/0153868 A1 | 6/2009 | Sawabe | |
| 2009/0184096 A1 | 7/2009 | Karasaki et al. | |
| 2009/0191693 A1 | 7/2009 | Iizuka | |
| 2009/0197351 A1 | 8/2009 | Morikazu | |
| 2009/0242522 A1 | 10/2009 | Baird et al. | |
| 2009/0242531 A1 | 10/2009 | Baird et al. | |
| 2010/0099239 A1 | 4/2010 | Dunne et al. | |
| 2010/0311313 A1 | 12/2010 | Uchiyama | |
| 2011/0037149 A1 | 2/2011 | Fukuyo | |
| 2011/0095006 A1 | 4/2011 | Hayashi | |
| 2011/0174787 A1 | 7/2011 | Ide | |
| 2011/0240619 A1 | 10/2011 | Hayashi | |
| 2011/0298084 A1 | 12/2011 | Tamemoto | |
| 2011/0318877 A1 | 12/2011 | Akiyama | |

FOREIGN PATENT DOCUMENTS

| | | |
|---|---|---|
| CN | 101100018 | 1/2009 |
| JP | 04-135083 | 5/1992 |
| JP | 05-177370 | 7/1993 |
| JP | 10-044139 | 2/1998 |
| JP | 10-305384 | 11/1998 |
| JP | 11-224866 | 8/1999 |
| JP | 2002-103066 | 4/2002 |
| JP | 2002-192367 | 7/2002 |
| JP | 2002-192370 | 7/2002 |
| JP | 2002-273585 | 9/2002 |
| JP | 3408805 | 3/2003 |
| JP | 2003-100653 | 4/2003 |
| JP | 2004-528991 | 9/2004 |
| JP | 2004-351466 | 12/2004 |
| JP | 2005-088068 | 4/2005 |
| JP | 2006-123228 | 5/2006 |
| JP | 2006-159254 | 6/2006 |
| JP | 2006-231411 | 9/2006 |
| JP | 2008-209299 | 9/2006 |
| JP | 3867107 | 10/2006 |
| JP | 2007-048995 | 2/2007 |
| JP | 2007-118011 | 5/2007 |
| JP | 2008-006492 | 1/2008 |
| JP | 2008-098465 | 4/2008 |
| JP | 2008-198905 | 8/2008 |
| JP | 2009-010105 | 1/2009 |
| JP | 2009-123875 | 6/2009 |
| JP | 2009-145292 | 7/2009 |
| JP | 2009-160625 | 7/2009 |
| JP | 2009-182019 | 8/2009 |
| JP | 2009-188203 | 8/2009 |
| JP | 2009-200140 | 9/2009 |
| JP | 2009-214182 | 9/2009 |
| JP | 2009-534850 | 9/2009 |
| JP | 2009-226457 | 10/2009 |
| JP | 2010-000542 | 1/2010 |
| JP | 2010-228007 | 10/2010 |
| JP | 2011-240383 | 1/2011 |
| JP | 2011-091322 | 5/2011 |
| JP | 2012-006039 | 1/2012 |
| JP | 2012-006040 | 1/2012 |
| JP | 2012-028734 | 2/2012 |
| JP | 2012-076093 | 4/2012 |
| JP | 2013-048244 | 3/2013 |
| JP | 2013-091074 | 5/2013 |
| KR | 10-0339057 | 5/2002 |
| KR | 10-0444919 | 8/2004 |
| KR | 10-2006-0042968 | 5/2006 |
| KR | 1020100039690 | 4/2010 |
| KR | 10-2011-0046315 | 5/2011 |
| TW | 200621409 | 7/2006 |
| TW | I260051 | 8/2006 |
| TW | 200944321 | 1/2009 |
| TW | 200924891 | 6/2009 |
| WO | WO 98/22995 | 5/1998 |
| WO | WO 2008/008678 | 1/2008 |
| WO | WO 2008/091447 | 7/2008 |
| WO | WO 2009/039184 | 3/2009 |
| WO | WO 2010/098186 | 9/2010 |
| WO | WO 2010/139841 | 12/2010 |

OTHER PUBLICATIONS

English Language Translation of Korean Office Action issued in KR 10-2011-0005848 Sep. 1, 2012.

English Language Abstract of JP 05-177370 published Jul. 20, 1993.

English Language Translation of JP 05-177370 published Jul. 20, 1993.

English Language Abstract of KR 20000048927 published Jul. 20, 2000 (later published as KR10-0339057 May 31, 2002.

Japanese Office Action issued in JP 2012-074937 dated Jun. 29, 2012.

English Language Translation of Japanese Office Action issued in JP 2012-074937 dated Jun. 29, 2012.

English Language Abstract of JP 2011-091322 published May 6, 2011.

English Language Translation of JP 2011-091322 published May 6, 2011.

English Language Abstract of JP 2010-228007 published Oct. 14, 2010.

English Language Translation of JP 2010-228007 published Oct. 14, 2010.

U.S. Appl. No. 12/911,277.

English Abstract of JP 2006-231411 published Sep. 7, 2006 corresponds to JP 3867107.

English Abstract of JP 2002-192370 published Jul. 10, 2002 corresponds to JP 3408805.

Midorikawa, Katsumi; Recent Progress of Femtosecond Lasers and Their Applications to Material Processing; Proceedings of Laser Materials Processing Conference; Dec. 1998; pp. 29-38; vol. 45; Japan.

(56) References Cited

OTHER PUBLICATIONS

English Translation of JP Patent 3867107 published Oct. 13, 2006.
English Translation of JP Patent 3408805 published Mar. 14, 2003.
English Language Abstract of JP 2009-200140 published Sep. 3, 2009.
English Language Translation of JP 2009-200140 published Sep. 3, 2009.
English Translation of JP 2002-192370 published Jul. 10, 2002 corresponds to JP 3408805.
English Language Translation of 2006-231411 published Sep. 7, 2006 which corresponds o JP 3867107.
U.S. Appl. No. 13/008,382.
Related U.S. Appl. No. 13/556,641
Related U.S. Appl. No. 13/556,668.
Korean Office Action issued in KR 10-2010-104013 on Jun. 14, 2012.
English Language Translation of Korean Office Action issued in KR 10-2010-104013 on Jun. 14, 2012.
English Language Abstract of JP 2002-103066 published Apr. 9, 2002.
English Language Translation of JP 2002-103066 published Apr. 9, 2002.
English Language Abstract of JP 4-135083 published May 8, 1992.
English Language Abstract of JP 11-224866 published Aug. 17, 1999.
English Language Translation of JP 11-224866 published Aug. 17, 1999.
English Language Abstract of JP 2003-100653 published Apr. 4, 2003.
English Language Translation of JP 2003-100653 published Apr. 4, 2003.
Korean Office Action issued in KR 10-2011-60952 on Aug. 2, 2012.
English Language Translation of Korean Office Action issued in KR 10-2011-60952 on Aug. 2, 2012.
Related U.S. Appl. No. 13/008,382.
Related U.S. Appl. No. 13/556,618.
Chinese Office Action issued in CN 201110023878.3 on Mar. 20, 2013.
English Language Translation of Chinese Office Action issued in CN 201110023878.3 on Mar. 20, 2013.
Taiwanese Office Action issued in TW 100121039 on Mar. 29, 2013.
English Language Translation of Taiwanese Office Action issued in TW 100121039 on Mar. 29, 2013.
English Language Abstract of JP 10-044139 published Feb. 17, 1998.
English Language Translation of JP 10-044139 published Feb. 17, 1998.
English Language Abstract of KR 1020100039690 published Apr. 16, 2010.
English Language Abstract of JP 2002-192367 published Jul. 10, 2002.
English Language Translation of JP 2002-192367 published Jul. 10, 2002.
U.S. Appl. No. 13/008,382 electronically captured Oct. 22, 2013.
U.S. Appl. No. 12/911,277 electronically captured Oct. 23, 2013.
Japanese Office Action issued in JP 2012-147728 on Feb. 19, 2013.
English Language Translation of Japanese Office Action issued in JP 2012-147728 on Feb. 19, 2013.
English Language Abstract of JP 2012-076093 published Apr. 19, 2012.
English Language Translation of JP 2012-076093 published Apr. 19, 2012.
English Language Abstract of JP 2007-048995 published Feb. 22, 2007.
English Language Translation of JP 2007-048995 published Feb. 22, 2007.
English Language Abstract of JP 2012-028734 published Feb. 9, 2012.
English Language Translation of JP 2012-028734 published Feb. 9, 2012.
U.S. Appl. No. 13/929,472 electronically captured Oct. 23, 2013.
U.S. Appl. 13/936,022 electronically captured Oct. 23, 2013.
Taiwanese Office Action issued in TW100101957 dated Jun. 28, 2013.
English Language Translation of Taiwanese Office Action issued in TW100101957 dated Jun. 28, 2013.
English Language Abstract of TW504879 (corresponding to CN 1347176) published Oct. 1, 2002.
English Language Abstract of JP 2011-240383 published Dec. 1, 2011.
English Language Translation of JP 2011-240383 published Dec. 1, 2011.
English Language Abstract of JP 2012-006040 published Dec. 1, 2012.
English Language Translation of JP 2012-006040 published Dec. 1, 2012.
English Language Abstract of JP 2012-006039 published Dec. 1, 2012.
English Language Translation of JP 2012-006039 published Dec. 1, 2012.
English Language Abstract of JP 2013-091074 published May 16, 2013.
English Language Translation of JP 2013-091074 published May 16, 2013.
English Language Abstract of JP 2013-048244 published Jul. 3, 2013.
English Language Translation of JP 2013-048244 published Jul. 3, 2013.
Japanese Office Action issued in JP 2012-147728 on Jul. 16, 2013.
English Language Translation of Japanese Office Action issued in JP 2012-147728 on Jul. 16, 2013.
Taiwanese Office Action issued in TW 099136123 on Aug. 20, 2013.
English Language Translation of Taiwan Office Action issued in TW 099136123 on Aug. 20, 2013.
English Language Abstract of JP 2009-160625 published Jul. 23, 2009.
English Language Translation of JP 2009-160625 published Jul. 23, 2009.
English Language Abstract of TW 2006/21409 published as TW 200621409 published on Jul. 1, 2011 (corresponds to US 2009/0081851).
English Language Abstract of JP 2006-122982 published May 18, 2006 (corresponds to US 2006/0092990)
English Language Translation of JP 2006-122982 published May 18, 2006 (corresponds to US 2006/0092990).
English Language Abstract of TW 200924891 published Jun. 16, 2009 (corresponding to WO 2009/039184).
English Language Abstract of JP-2009-123875 published Jun. 4, 2009.
English Language Translation of JP-2009-123875 published Jun. 4, 2009.
Korean Office Action issued in KR 10-2012-81839 on Aug. 23, 2013.
English Language Translation of Korean Office Action issued in KR 10-2012-81839 on Aug. 23, 2013.
Korean Office Action issued in KR 10-2012-81534 on Aug. 22, 2013.
English Language Translation of Korean Office Action issued in KR 10-2012-81534 on Aug. 22, 2013.
Korean Office Action issued in KR 10-2012-0081623 on Aug. 23, 2013.
English Language Translation of Korean Office Action issued in KR 10- 2012-0081623 on Aug. 23, 2013.
English Language Abstract of KR 10-2011-0046315 published May 4, 2011.
Japanese Office Action issued in JP 2010-011348 on Aug. 20, 2013.
English Language Translation of Japanese Office Action issued in JP 2010-011348 on Aug. 20, 2013.
English Lanauage Abstract and Translation of JP 10-305384 published Nov. 17, 1998.
English Language Abstract and Translation of JP2009-214182 published Sep. 24, 2009.
U.S. Appl. No. 13/556,618 electronically captured on Nov. 27, 2013.
U.S. Appl. No. 12/911,277 electronically captured on Nov. 27, 2013.
Japanese Office Action issued in JP 2009-245573 on Oct. 1, 2013.

(56) References Cited

OTHER PUBLICATIONS

English Language Translation of Japanese Office Action issued in JP 2009-245573 on Oct. 1, 2013.
English Language Abstract and Translation of JP 2009-145292 published Jul. 2, 2009.
English Language Abstract and Translation of JP 2007-118011 published May 17, 2007.
English Language Abstract and Translation of JP 2006-159254 published Jun. 22, 2006.
English Language Abstract and Translation of JP 2008-209299 published Sep. 11, 2008.
English Language Abstract and Translation of JP 2002-273585 published Sep. 25, 2002.
Korean Office Action issued in KR 10-2012-0081623 dated Feb. 11, 2014.
English Language Translation of Korean Office Action issued in KR 10-2012-0081623 dated Feb. 11, 2014.
Japanese Office Action issued in JP 2009-245573 on Mar. 4, 2014.
English Language Translation of Japanese Office Action issued in JP 2009-245573 on Mar. 4, 2014.
English Language Abstract and Translation of JP 2009-534850 published on Sep. 24, 2014.
English Language Abstract and Translation of JP 2009-188203 published Aug. 20, 2009.
English Language Abstract and Translation of JP 2005-088068 published on Apr. 7, 2005.
English Language Abstract and Translation of JP 2004-351466 published on Dec. 16, 2004.
English Language Abstract and Translation of JP 2004-528991 published on Sep. 24, 2004.
English Language Abstract and Translation of JP 10-305384 published on Nov. 17, 1998.
English Language Abstract and Translation of JP 2009-226457 published on Oct. 8, 2009.
English Language Abstract and Translation of JP 2008-098465 published on Apr. 24, 2008.
English Language Abstract and Translation of JP 2008-006492 published Jan. 17, 2008.
Japanese Office Action issued in JP 2012-152237 dated Apr. 22, 2014.
English Language Translation of Japanese Office Action issued in JP 2012-152237 dated Apr. 22, 2014.
English Language Abstract and Translation of JP 2008-198905 published Aug. 28, 2008.
U.S. Appl. No. 13/556,618 electronically captured on May 27, 2014.
Japanese Office Action issued in JP 2012-192985 on Jan. 7, 2014.
English Language Japanese Office Action issued in JP 2012-192985 on Jan. 7, 2014.
English Language Abstract and Translation of JP 2009-1010105 published on Jan. 15, 2009.
English Language Abstract and Translation of JP 2010-000542 published on Jan. 7, 2010.
English Language Abstract and Translation of JP 2006-123228 published on May 18, 2006.
U.S. Appl. No. 13/008,382 electronically captured on Feb. 24, 2014.
U.S. Appl. No. 12/911,277 electronically captured on Feb. 24, 2014.
Taiwanese Office Action issued in TW 101125794 dated May 28, 2014 (with English Language Translation).
English Language Abstract and Translation of JP 2009-182019 published on Aug. 13, 2009.
Chinese Office Action issued in CN 201210265293.7 dated May 19, 2014 with English Language Translation.
Taiwanese Office Action issued in TW 101125650 dated Jun. 11, 2014 (with English Language Translation).
U.S. Appl. No. 13/008,382 electronically captured on Jul. 28, 2014.
U.S. Appl. No. 12/911,277 electronically captured on Jul. 28, 2014.
U.S. Appl. No. 13/556,641 electronically captured on Jul. 28, 2014.
English Language Abstract for CN 1700444 published on Nov. 23, 2005.
English Language Abstract for CN 10110018 published on Jan. 9, 2009.

\* cited by examiner

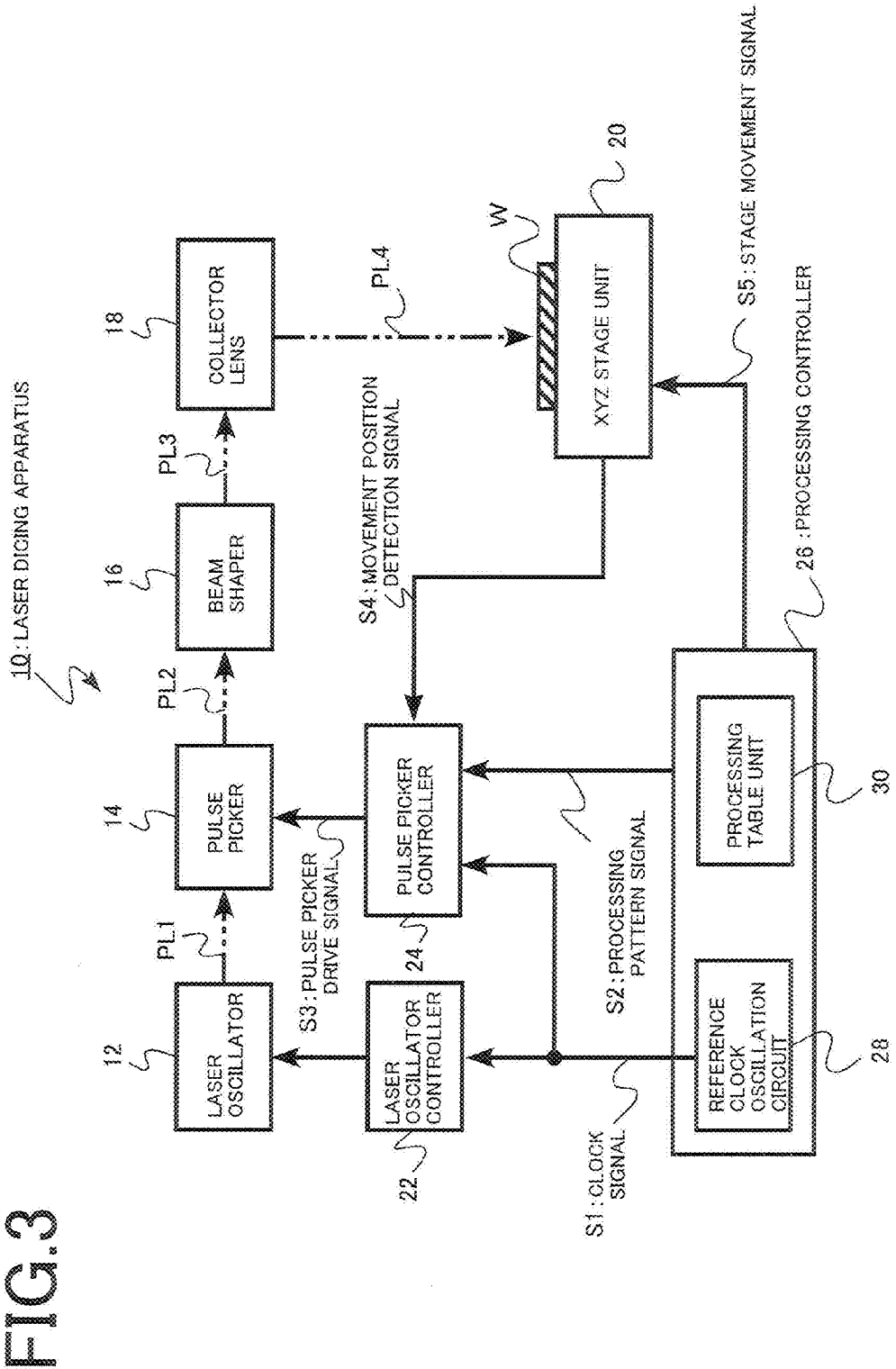

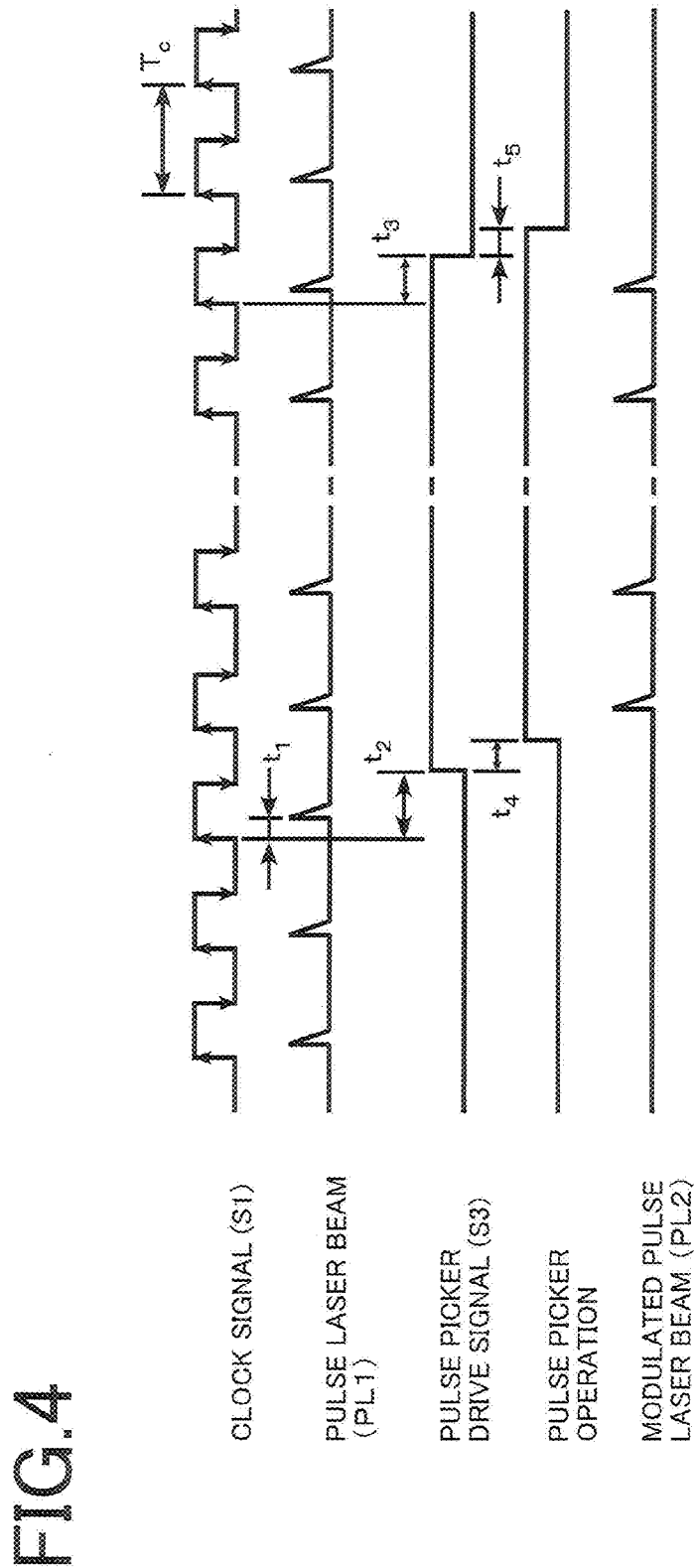

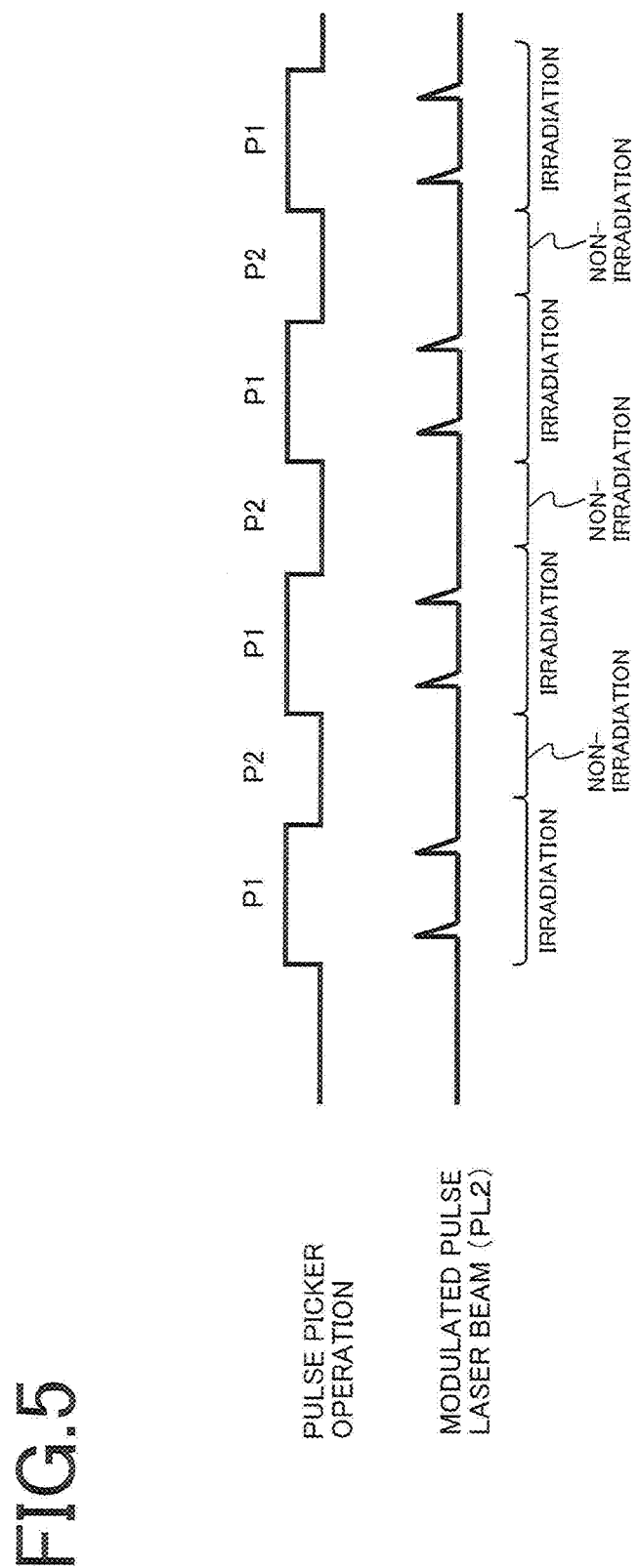

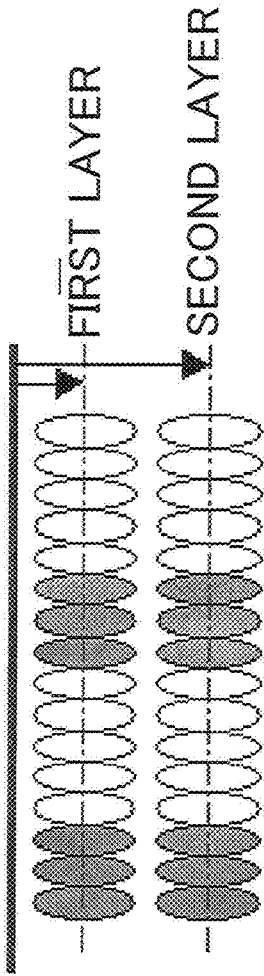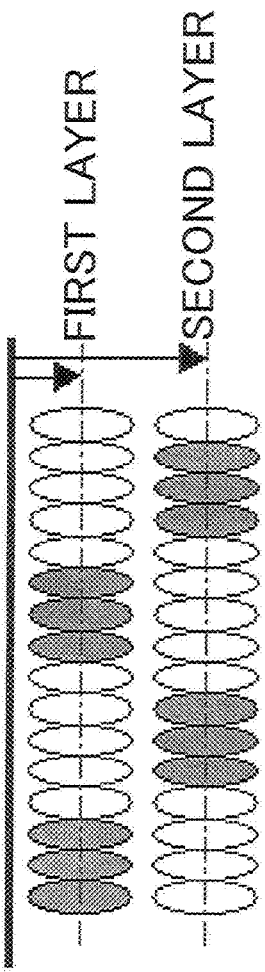
FIG.11A SAME PHASE
FIG.11B DIFFERENT PHASE

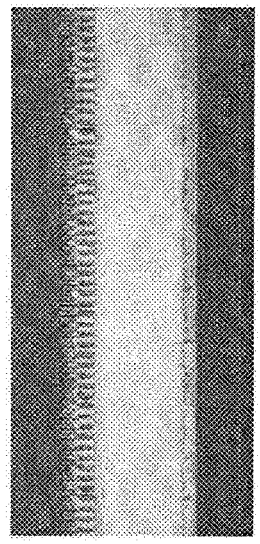
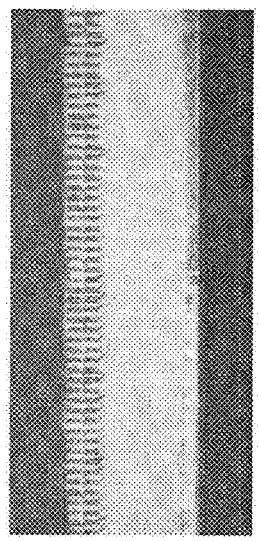
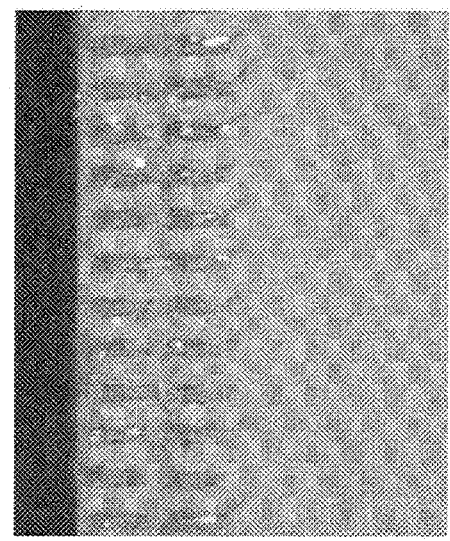
FIG. 12B DIFFERENT PHASE
FIG. 12A SAME PHASE

FIG. 16A
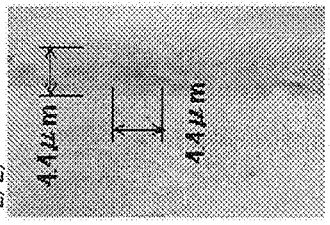
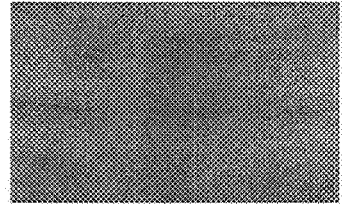
EXAMPLE 5
90mW
(IRRADIATION/
NON-IRRADIATION
=1/1)
38μm
FIG. 16B
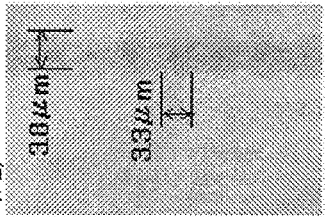
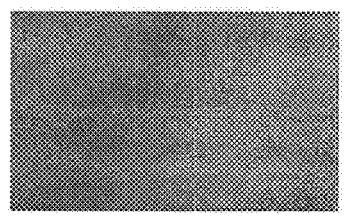
EXAMPLE 6
90mW
(IRRADIATION/
NON-IRRADIATION
=1/2)
38μm
33μm
FIG. 16C
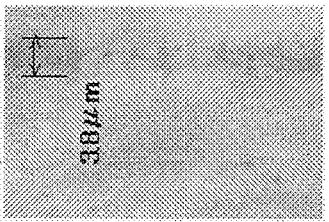
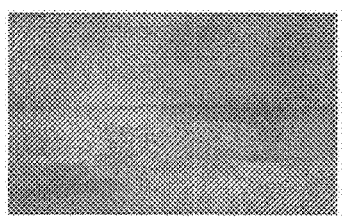
EXAMPLE 7
90mW
(IRRADIATION/
NON-IRRADIATION
=2/2)
4.4μm
4.4μm

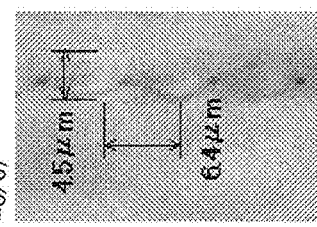
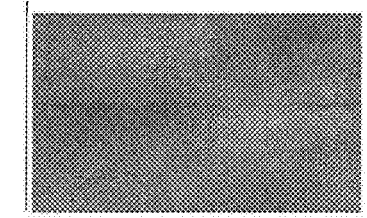
FIG.16D
EXAMPLE 8
90mW
(IRRADIATION/
NON-IRRADIATION
=1/3)
38μm
37μm
FIG.16E
EXAMPLE 9
90mW
(IRRADIATION/
NON-IRRADIATION
=2/3)
45μm
49μm
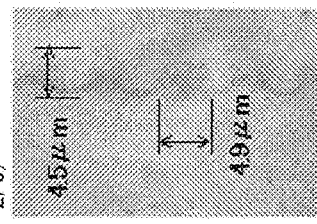
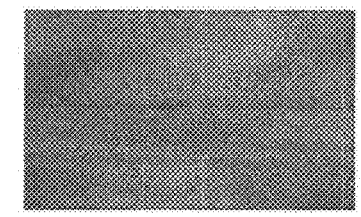
FIG.16F
EXAMPLE 10
90mW
(IRRADIATION/
NON-IRRADIATION
=3/3)
45μm
64μm
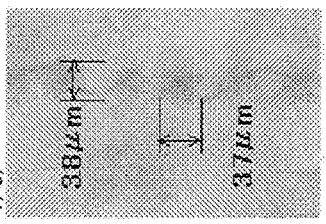
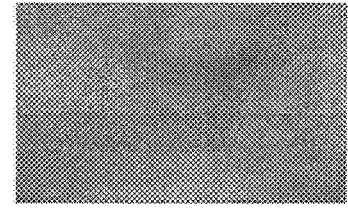

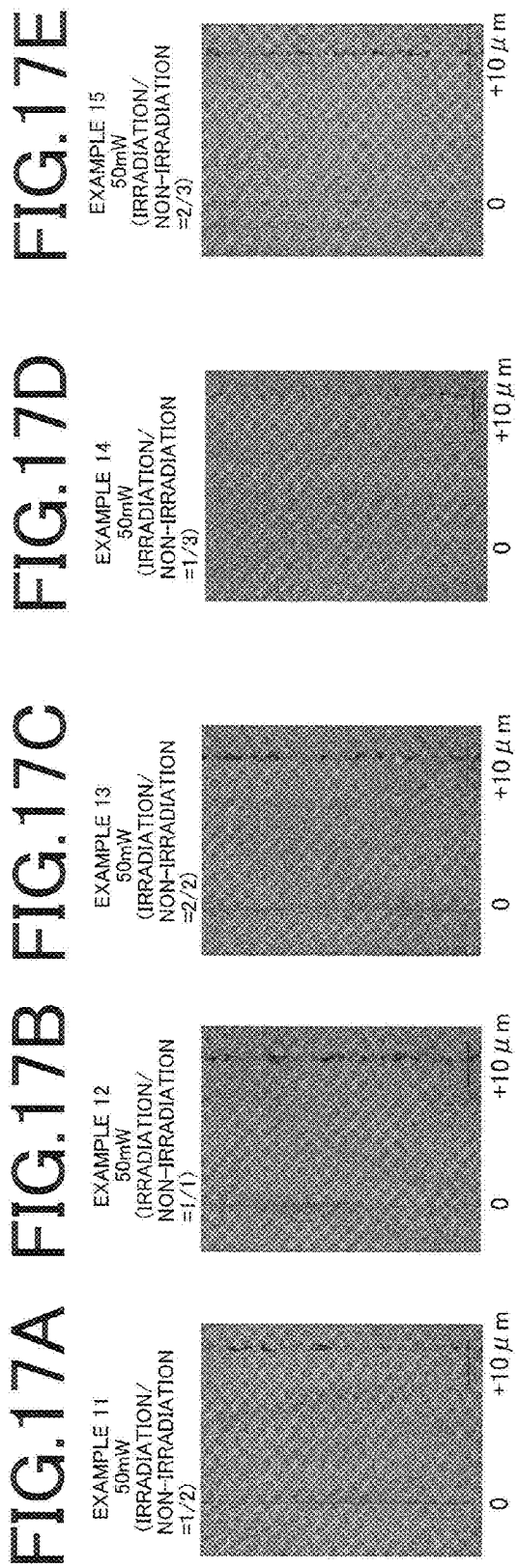

EXAMPLE 16
90mW
(IRRADIATION/
NON-IRRADIATION
=1/1)

EXAMPLE 17
90mW
(IRRADIATION/
NON-IRRADIATION
=1/2)

EXAMPLE 18
90mW
(IRRADIATION/
NON-IRRADIATION
=2/2)

EXAMPLE 19
90mW
(IRRADIATION/
NON-IRRADIATION
=1/3)

EXAMPLE 20
90mW
(IRRADIATION/
NON-IRRADIATION
=2/3)

EXAMPLE 21
90mW
(IRRADIATION/
NON-IRRADIATION
=1/4)

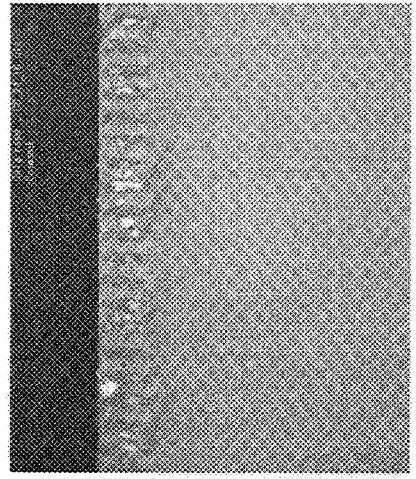
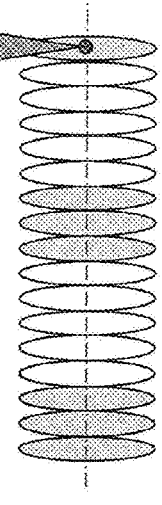
FIG. 19A
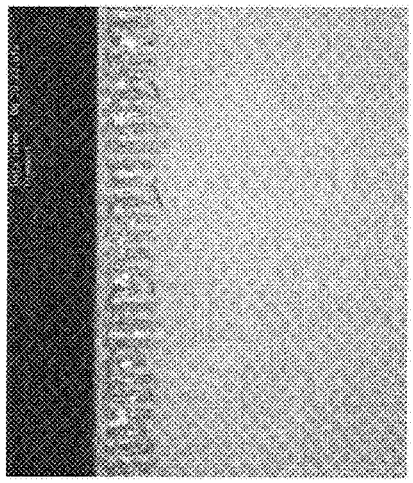
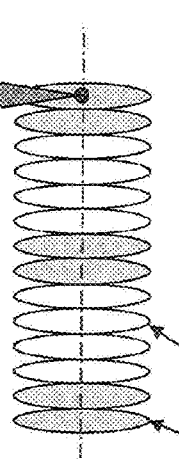
FIG. 19B
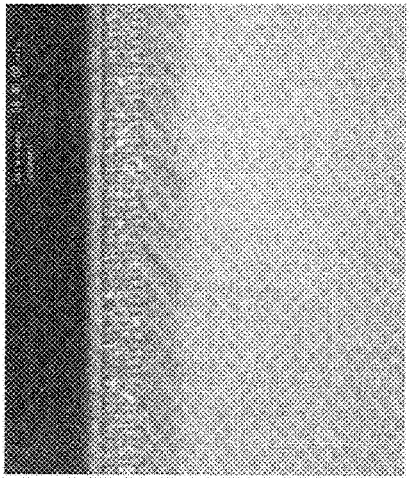
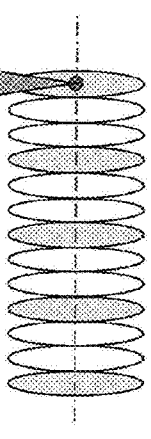
FIG. 19C

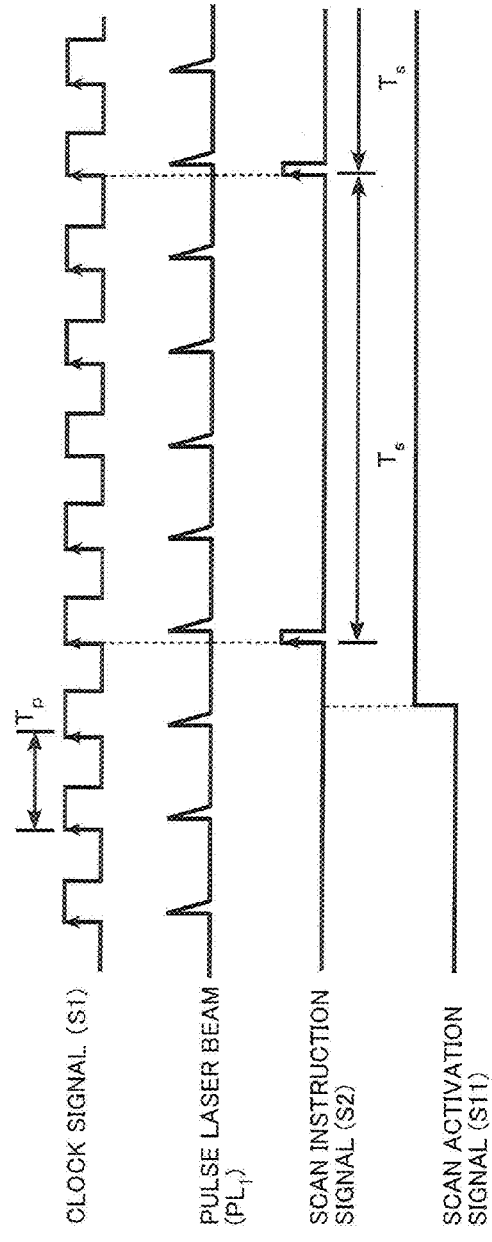
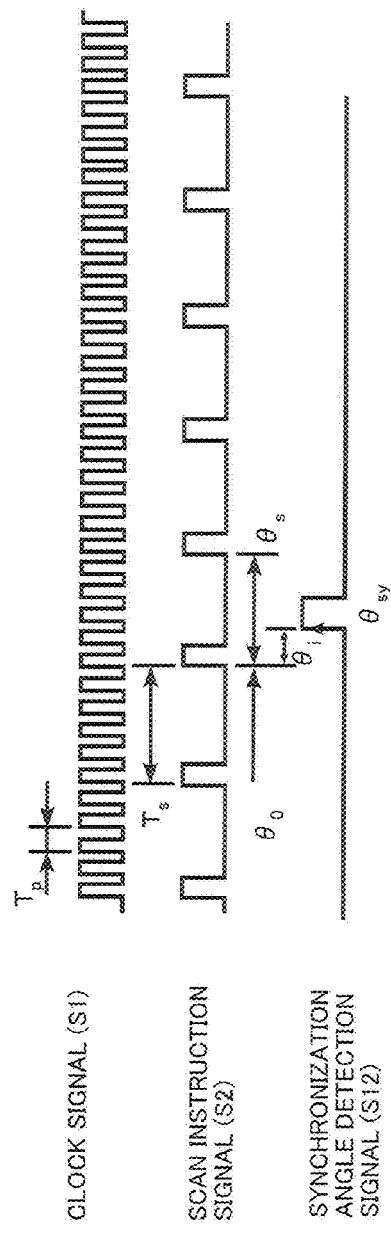
FIG.26A
FIG.26B

DICING METHODS

CROSS-REFERENCE TO RELATED APPLICATION

This application is based on and claims priority of Japanese Patent Application (JPA) No. 2010-144223, filed on Jun. 24, 2010, and No. 2011-091811, filed on Apr. 18, 2011, the entire contents of which are incorporated herein by reference.

FIELD OF THE INVENTION

The present invention relates to dicing methods.

BACKGROUND OF THE INVENTION

A semiconductor wafer having semiconductor devices such as ICs and LSIs formed in the surface thereof is subjected to bottom face grinding to have a desired thickness. After that, the semiconductor wafer is divided into individual semiconductor chips along preliminary dividing lines called dicing lines (or streets), and the semiconductor chips are used as LEDs, MEMSs, or the like in various kinds of electronic apparatuses.

Examples of dicing methods of dividing semiconductor wafers into individual devices (chips) include the following methods:

1) A dicing method by which a semiconductor wafer is cut and divided along dicing lines with a cutting blade having thickness of approximately 20 to 40 μm, for example;
2) A dicing method using a scribing technique by which a diamond wheel having a shape of an abacas bead or a diamond blade is put into contact with a semiconductor wafer to scratch the surface of the semiconductor wafer like glass cutting, and the semiconductor wafer is then cleaved with a breaker;
3) A dicing method using abrasion by which laser energy is gathered into an extremely small area on a semiconductor wafer in a short period of time by using a laser beam such as YAG laser, so that the solid is sublimed; and
4) A dicing method by which a pulse laser beam having a wavelength that exhibits permeation properties for semiconductor wafers is emitted.

According to the method of 4), the light collecting point is set inside a semiconductor wafer, and a pulse laser beam having a wavelength that exhibits permeability properties for wafers is emitted along dicing lines. Altered layers are formed in series in the semiconductor wafer, and an external force is then applied along the dicing lines having strength lowered by the formation of the altered layers. In this manner, the semiconductor wafer is divided into individual chips (Japanese Patent No. 3,408,805, for example).

In the case of a semiconductor wafer having devices such as power transistors formed in a surface thereof, an electrode coated with a metal film that is made of gold, silver, titanium, or the like, and has a thickness of several millimeters is normally formed on the bottom surface of the semiconductor wafer. A sapphire substrate used for LEDs also has a metal film that is made of gold, aluminum, or the like, and has a thickness of several μm on a wafer bottom surface thereof. The metal film serves as a reflection film to increase luminance.

In a case where a metal film is formed on the bottom surface of a wafer as described above, one of the above dicing methods 1), 2), and 3) is used, for example. Alternatively, after an operation is performed according to the method 4), a metal film may be formed on the bottom surface of a semiconductor wafer (Japanese Patent Application Laid-Open No. 2009-200140, for example).

However, such a metal film has viscosity. Therefore, if a semiconductor wafer having a bottom surface coated with a metal film is cut by a cutting blade according to the method 1) or the like, burrs appear in the outer peripheries of the bottom surfaces of the divided semiconductor chips. Also, metal dust adheres to the cutting blade, and causes clogging. As a result, the service life of the cutting blade becomes shorter.

According to the method 2), the diamond wheel having a shape like an abacus bead or the diamond blade is expendable. For example, after two sapphire substrates of 2 inches in thickness are processed, the diamond wheel or the diamond blade becomes worn and needs to be replaced with a new one. The machine stoppage period required for the replacement leads to a decrease in throughput. Also, the replacement blade increases the operation costs, resulting in an increase in product price.

According to the method 3), a laser beam is gathered onto a metal surface, to melt the metal at the light collecting point, or turn the metal into a gaseous material or plasma. However, molten material or processing dust called debris is generated in either way. Therefore, the method is not suitable for semiconductor chip manufacture that dislikes processing dust.

According to the method 4), a pulse laser beam having a wavelength with permeation properties is used. However, a laser beam cannot permeate a metal film. Therefore, an altered layer cannot be formed in the substrate under the metal film. To counter this problem, there is a suggested method by which the metal film on the bottom surface is removed by etching, and dicing is performed by emitting a laser beam to the portions from which the metal film has been removed. In such a case, however, an expensive etching device is required, and the product price becomes higher accordingly.

The present invention has been made in view of the above circumstances, and the object thereof is to provide a dicing method that achieves excellent dicing properties at low costs by removing a metal film through a metal processing operation with a diamond tool and then performing pulse laser beam irradiation.

SUMMARY OF THE INVENTION

A dicing method according to an aspect of the present invention is a method of dicing a substrate to be processed, devices being formed in the substrate to be processed, a metal film being formed on one surface of the substrate to be processed. The dicing method includes: placing the substrate to be processed onto a first stage; forming a groove portion by removing the metal film through a metal processing operation with a diamond tool; placing the substrate to be processed onto a second stage; generating a clock signal; emitting a pulse laser beam synchronized with the clock signal to the groove portion of the substrate to be processed; moving the substrate to be processed and the pulse laser beam relative to each other; switching the pulse laser beam between irradiation and non-irradiation of the substrate to be processed on a light pulse basis by controlling passing and blocking of the pulse laser beam with a pulse picker in synchronization with the clock signal; and forming cracks in the substrate to be processed, the cracks reaching the substrate surface.

In the method according to the above aspect, the cracks are preferably formed in series in the surface of the substrate to be processed, by controlling irradiation energy of the pulse laser beam, the processing point depth of the pulse laser beam, and the intervals between irradiation and non-irradiation with the pulse laser beam.

In the method according to the above aspect, the cracks are preferably formed linearly in the surface of the substrate to be processed.

In the method according to the above aspect, it is preferable to apply an external force after the cracks are formed.

In the method according to the above aspect, the metal processing operation is preferably performed by a planar processing technique or a flycut processing technique.

In the method according to the above aspect, in the metal processing operation, cutting is preferably performed on the surface of the substrate to be processed.

In the method according to the above aspect, the position of the substrate to be processed and the operation start position of the pulse picker are preferably synchronized with each other. At this point, the stage is preferably moved in synchronization with the clock signal, so as to move the substrate to be processed and the pulse laser beam relative to each other.

In the method according to the above aspect, the substrate to be processed is preferably a sapphire substrate.

In the method according to the above aspect, the irradiation energy is preferably set at 30 to 150 mW, and the pulse laser beam is preferably allowed to pass in every 1 to 4 light pulses and is blocked in every 1 to 4 light pulses. with this arrangement, the pitch of irradiation is preferably set at 1 to 6 μm.

The irradiation energy is preferably set at 50±5 mW. The processing point depth is preferably set at 25.0±2.5 μm. The pitch of irradiation is preferably set at 3.6±0.4 μm by allowing one light pulse of the pulse laser beam to pass at a time, and blocking two light pulses at a time.

A dicing method according to another aspect of the present invention is a method of dicing a substrate to be processed, devices being formed in the substrate to be processed, a metal film being formed on one surface of the substrate to be processed. The dicing method includes: placing the substrate to be processed onto a first stage; removing the metal film through a metal processing operation with a diamond tool; placing the substrate to be processed onto a second stage; generating a clock signal; emitting a pulse laser beam synchronized with the clock signal; applying the pulse laser beam to a surface of the substrate to be processed in a one-dimensional direction with a pulse picker and a laser beam scanner, while switching the pulse laser beam between passing and blocking in synchronization with the clock signal; after applying the pulse laser beam in the one-dimensional direction, moving the stage in a direction perpendicular to the one-dimensional direction; further applying the pulse laser beam in the one-dimensional direction in synchronization with the clock signal; and forming cracks in the substrate to be processed, the cracks reaching the substrate surface. The processing origin position in each scanning operation is corrected by controlling the passing and blocking of the pulse laser beam at the pulse picker, based on a scan position signal supplied from the laser beam scanner.

In the method according to the above aspect, the movement of the second stage in the direction perpendicular to the one-dimensional direction is preferably controlled, based on the scan position signal supplied from the laser beam scanner.

The present invention can provide a dicing method that achieves excellent dicing properties at low costs by removing a metal film through a metal processing operation with a diamond tool and then performing pulse laser beam irradiation.

BRIEF DESCRIPTION OF THE DRAWINGS

FIG. 3 is a schematic diagram showing an example structure of the laser dicing apparatus used according to the laser dicing method of the first embodiment;

FIG. 4 is a diagram illustrating the timing control operations according to the laser dicing method of the first embodiment;

FIG. 5 is a diagram showing the pulse picker operation and the timing of a modulated pulse laser beam according to the laser dicing method of the first embodiment;

FIGS. 11A and 11B are diagrams for explaining cases where cracks are formed by applying pulse laser beams having processing points at different depths along the same scanning line in a substrate several times;

FIGS. 12A and 12B are optical photographs of diced faces formed under the conditions illustrated in FIGS. 11A and 11B, respectively;

FIGS. 16A through 16F show the results of laser dicing operations of Examples 5 through 10;

FIGS. 17A through 17E show the results of laser dicing operations of Examples 11 through 15;

FIGS. 19A through 19C show the results of laser dicing operations of Examples 22 through 24;

FIGS. 26A and 26B are signal waveform charts for explaining timing control performed in the pulse laser processing apparatus according to the second embodiment.

DETAILED DESCRIPTION OF THE INVENTION

The following is a description of embodiments of the present invention, with reference to the accompanying drawings. It should be noted that, in this specification, a processing point is a point near the collecting position (focal position) of a pulse laser beam in a substrate to be processed, and at the processing point, the degree of property modification of the substrate to be processed becomes the highest in the depth direction. A processing point depth is the depth of the processing point of a pulse laser beam, measured from the surface of the substrate to be processed.

(First Embodiment)

A dicing method according to this embodiment is a method of dicing a substrate to be processed, devices being formed in the substrate to be processed, a metal film being formed on one surface of the substrate to be processed. The dicing method includes: placing the substrate to be processed onto a first stage; forming a groove portion by removing the metal film through a metal processing operation with a diamond tool; placing the substrate to be processed onto a second stage; generating a clock signal; emitting a pulse laser beam synchronized with the clock signal to the groove portion of the substrate to be processed; moving the substrate to be processed and the pulse laser beam relative to each other; switching the pulse laser beam between irradiation and non-irradiation of the substrate to be processed on a light pulse basis by controlling passing and blocking of the pulse laser beam in synchronization with the clock signal; and forming cracks in the substrate to be processed, the cracks reaching the substrate surface.

With the above described dicing method, high throughput and excellent dicing properties can be achieved in dicing a substrate having a metal film to be processed. In a pulse laser beam processing operation, cracks are formed in series in the surface of the substrate to be processed. Accordingly, dicing can be easily performed even on a hard substrate such as a sapphire substrate. Also, dicing with a small dicing width can be performed. Here, the excellent dicing properties include: 1) dicing with high linearity; 2) dicing with a small dicing force that increases the yield of diced devices; and 3) prevention of deterioration of devices in the substrate such as LED devices in an epitaxial layer on the substrate due to adverse influence of the laser emitted to form cracks.

Figure 2A:
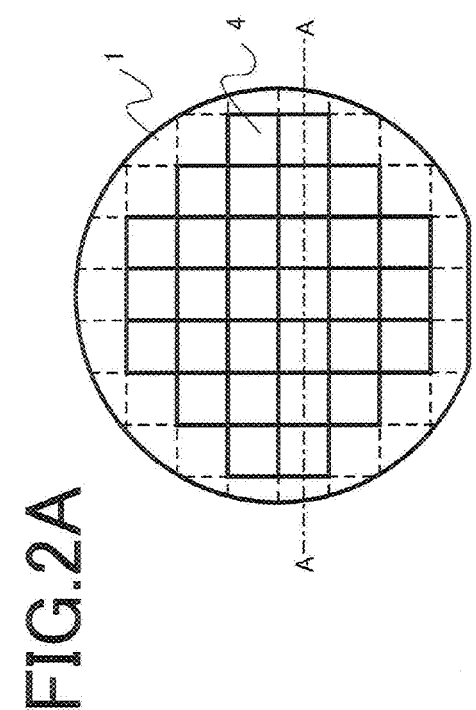
FIGS. 2A and 2B are conceptual diagrams of a semiconductor wafer taken as an example of a substrate to be processed in the first embodiment.
Figure 2B:
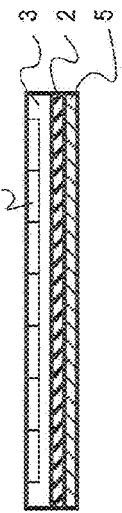

FIGS. 2A and 2B are conceptual diagrams of a semiconductor wafer taken as an example of a substrate to be processed in this embodiment. FIG. 2A is a top view of the semiconductor wafer, and FIG. 2B is a cross-sectional view of the semiconductor wafer, taken along the line A-A of FIG. 2A.

In this semiconductor wafer 1, high-intensity LED devices 4 are formed in a GaN-based semiconductor layer 3 on a sapphire substrate 2, for example. A reflective film made of gold (Au) or aluminum (Al) is formed as a metal film 5 on the opposite face of the face on which the high-intensity LED devices 4 are formed.

The respective high-intensity LED devices 4 are sectioned by dicing lines (shown by the solid lines in FIG. 2A) that have a certain width for dicing and have no devices formed thereon. When dicing is performed, wafers are diced along the dicing lines and extended lines (shown by the dashed lines in FIG. 2A) of the dicing lines, so that the wafer is divided into LEDs serving as individual chips.

FIGS. 1A through 1D are conceptual diagrams showing the procedures according to a dicing method of this embodiment.

Figure 1A:
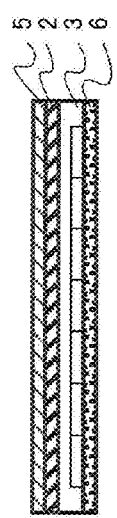
FIGS. 1A through 1D are conceptual diagrams showing the procedures according to a dicing method of a first embodiment.

First, as shown in FIG. 1A, an adhesive tape 6 for binding the respective chips when the semiconductor wafer is divided into the chips by dicing is formed on the face of the semiconductor wafer in which the high-intensity LED devices 4 are formed.

Figure 1B:

The semiconductor wafer is placed on a stage (the first stage) of a metal processing apparatus. The metal processing apparatus is a known apparatus that is capable of processing metal, using a diamond tool 7. The metal film 5 of the semiconductor wafer placed on the stage is then partially removed along the dicing lines by a metal processing operation using the diamond tool 7, as shown in FIG. 1B.

The metal processing technique used here may be a planar processing technique by which the diamond tool is moved linearly in relation to the stage, or a flycut processing technique by which the diamond tool is moved rotationally in relation to the stage, for example. To increase the processing accuracy of the metal film 5, the planar processing technique is preferred.

The portions of the metal film 5 remaining on the bottoms of the grooves may be completely removed or partially left. After the portions of the metal film 5 remaining on the bottoms of the grooves are completely removed, cutting along the grooves may be performed on the surface of the sapphire substrate 2, to reduce the external force to be later applied when the semiconductor wafer is diced. Alternatively, the metal film 5 may be left on the bottoms of the grooves by such a thickness as to allow laser beams to pass therethrough. In this manner, generation of cutting dust from the sapphire substrate 2 cut by the diamond tool 7 can be prevented, and the crack formation by the laser processing operation to be performed later can be stabilized.

As described above, according to this embodiment, an optimum processing technique for the substrate to be processed, the material and thickness of the metal film, and the like can be advantageously selected and performed.

When metal processing is performed, cutting dust is preferably sucked by a suction nozzle provided in the vicinity of the diamond tool 7.

Figure 1C:
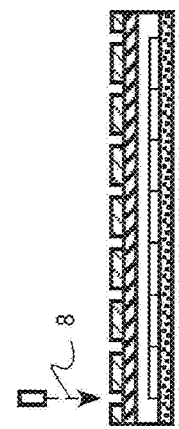

The semiconductor wafer is then placed on a stage (the second stage) of a pulse laser processing apparatus. A clock signal is generated in the pulse laser processing apparatus, and a pulse laser beam 8 in synchronization with the clock signal is emitted into each groove of the semiconductor wafer, as shown in FIG. 1C. At this point, the focal position of the pulse laser beam 8 is a predetermined position in the sapphire substrate 2.

The semiconductor wafer and the pulse laser beam 8 are then moved in relation to each other. Passing and blocking of the pulse laser beam 8 are controlled in synchronization with the clock signal, so that irradiation and non-irradiation of the semiconductor wafer with the pulse laser beam 8 are switched on a light pulse basis. In this manner, cracks that reach the wafer surface on the side of the metal film 5 are formed in the semiconductor wafer.

As will be described later, at the time of laser processing, a series of cracks are formed in the surface of the substrate to be processed, by controlling the irradiation energy of the pulse laser beam 8, the depth of the processing point of the pulse laser beam 8, and the intervals between irradiation and non-irradiation with the pulse laser beam 8.

Figure 1D:
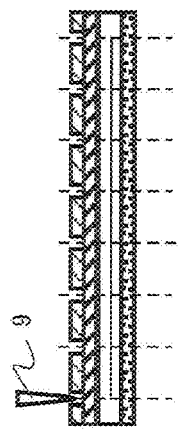

External force is then applied to the semiconductor wafer by a breaker 9 of a breaking device, so as to divide the semiconductor wafer into the individual high-intensity LED chips, as shown in FIG. 1D. At this point, instead of the use of the breaking device, the adhesive tape 6 may be stretched to apply external force to the semiconductor wafer. Alternatively, external force may be applied by using both the breaking device and the adhesive tape.

According to this embodiment, a dicing method that can achieve high throughput, low costs, high yield, and high-precision can be realized.

In the example described above, laser dicing is performed after all the metal film on the dicing lines is removed from the wafer by the metal processing apparatus. Such procedures are naturally carried out in a case where the two apparatuses of the metal processing apparatus and the pulse laser processing apparatus are used. However, the metal film removal and the laser processing through irradiation with a pulse laser beam may be performed as a set for each dicing line. In this case, the number of times scanning is performed along the dicing lines can be halved, and accordingly, the throughput is advantageously improved. Also, the matching accuracy between the metal processing and the laser processing is improved, and higher-precision dicing can be performed.

The above method is realized by using a processing apparatus that is designed to integrate the metal processing and the laser processing, and have the position of the diamond tool and the position of the laser beam irradiation on a straight line in relation to the relative displacement with the semiconductor wafer. In this apparatus, the first stage also serves as the second stage.

Next, laser dicing according to this embodiment is described in detail.

In the above described dicing method, a laser dicing apparatus according to this embodiment that realizes the laser processing includes: a stage on which the substrate to be processed can be placed; a reference clock oscillation circuit that generates a clock signal; a laser oscillator that emits a pulse laser beam; a laser oscillator controller that synchronizes the pulse laser beam with the clock signal; a pulse picker that is provided in a light path between the laser oscillator and the stage, and switches the pulse laser beam between irradiation and non-irradiation of the substrate to be processed; and a pulse picker controller that controls passing and blocking of the pulse laser beam at the pulse picker on a light pulse basis, in synchronization with the clock signal.

FIG. 3 is a schematic block diagram showing an example structure of the laser dicing apparatus according to this embodiment. As shown in FIG. 3, the laser dicing apparatus 10 according to this embodiment includes the following main components: a laser oscillator 12, a pulse picker 14, a beam shaper 16, a collector lens 18, an XYZ stage unit 20, a laser oscillator controller 22, a pulse picker controller 24, and a processing controller 26. The processing controller 26 includes a reference clock oscillation circuit 28 that generates a desired clock signal S1, and a processing table unit 30.

The laser oscillator 12 is designed to emit a pulse laser beam PL1 at a frequency Tc synchronized with the clock signal S1 generated by the reference clock oscillation circuit 28. The intensity of emitted pulsed light indicates a Gaussian distribution. The clock signal S1 is a processing control clock signal that is used for controlling laser dicing.

The wavelength of the laser emitted from the laser oscillator 12 has permeation properties with respect to the substrate to be processed. The laser used here may be Nd:YAG laser, Nd:YVO$_4$ laser, Nd:YLF laser, or the like. For example, where the substrate to be processed is a sapphire substrate; it is preferable to use Nd:YVO$_4$ laser of 532 nm in wavelength.

The pulse picker 14 is provided in the light path between the laser oscillator 12 and a beam shaper 16. The pulse laser beam PL1 is switched between passing and blocking (ON/OFF) in synchronization with the clock signal S1, so that the pulse laser beam PL1 is switched between irradiation and non-irradiation of the substrate to be processed on a light pulse basis. In this manner, switching on and off of the pulse laser beam PL1 is controlled to process the substrate through the operation of the pulse picker 14, and the pulse laser beam PL1 turns into a modulated pulse laser beam PL2.

The pulse picker 14 is preferably formed by an acousto-optic modulator (AOM), for example. Alternatively, an electro-optic modulator (EOM) of a Raman diffraction type may be used.

The beam shaper 16 turns the incoming pulse laser beam PL2 into a pulse laser beam PL3 shaped into a desired form. For example, the beam shaper 16 may be a beam expander that enlarges a beam diameter at a certain rate. Alternatively, an optical device such as a homogenizer that uniforms the optical intensity distribution in the beam cross-section surface may be provided. Also, a device that rounds the beam cross-section, or an optical device that circularly polarizes the beam may be provided.

The collector lens 18 is designed to collect the pulse laser beam PL3 shaped by the beam shaper 16, and emit a pulse laser beam PL4 onto the substrate W to be processed such as a sapphire substrate that has LEDs formed in the lower surface thereof and is placed on the XYZ stage unit 20.

The XYZ stage unit 20 includes: an XYZ stage (hereinafter also referred to simply as the stage) that can have the substrate W to be processed placed thereon and freely move in the XYZ-directions; a drive mechanism for the stage; and a position sensor having a laser interferometer that measures the position of the stage, for example. The XYZ stage is designed to have high positioning accuracy and a displacement error on the order of submicrons. The XYZ stage is moved in the Z-direction, to adjust the focal position of each pulse laser beam with respect to the substrate W to be processed, and control the depth of the processing point.

The processing controller 26 controls all the processing operations performed by the laser dicing apparatus 10. The reference clock oscillation circuit 28 generates the desired clock signal S1. A processing table in which dicing processing data is described as the numbers of light pulses in pulse laser beams is stored in the processing table unit 30.

Referring now to FIGS. 3 through 10, a laser dicing method using the above described laser dicing apparatus 10 is described.

First, the substrate W to be processed, such as a sapphire substrate, is placed on the XYZ stage unit 20. The sapphire substrate is a wafer that has a GaN layer epitaxially-grown in the lower surface thereof, and has LEDs formed as a pattern in the GaN layer. Based on notches or orientation flats formed on the wafer, wafer positioning with respect to the XYZ stage is performed. In the example case described below, the dicing line portions of the metal film formed on the bottom surface has already been removed.

FIG. 4 is a diagram illustrating the timing control operations according to the laser dicing method of this embodiment. At the reference clock oscillation circuit 28 in the processing controller 26, the clock signal S1 at the frequency Tc is generated. The laser oscillator controller 22 controls the laser oscillator 12 to emit the pulse laser beam PL1 at the frequency Tc synchronized with the clock signal S1. At this point, there is a delay time $t_1$ between each rising edge of the clock signal S1 and each corresponding rising edge of the pulse laser beam PL1.

The laser beam used here has a wavelength that exhibits permeation properties with respect to the substrate to be processed. Here, it is preferable to use a laser beam having a higher photon energy hv in the emitting laser beam than the absorption bandgap Eg of the material of the substrate to be processed. When the energy hv is much larger than the bandgap Eg, the laser beam is absorbed. This is called multiphoton absorption. If the pulse width of the laser beam is made extremely small to cause the multiphoton absorption in the substrate to be processed, the multiphoton absorption energy is not transformed into thermal energy, but persistent structural changes, such as changes in ion valence, crystallization, noncrystallization, polarized orientation, or minute crack formation, are induced. As a result, a color center is formed.

As for the irradiation energy (irradiation power) of the laser beam (pulse laser beam), an optimum value is selected to form a series of cracks in the surface of the substrate to be processed.

Where a wavelength having permeation properties with respect to the material of the substrate to be processed is used, the laser beam can be guided and collected in the vicinity of the focal point inside the substrate. Accordingly, a color center can be locally formed. The color center will be hereinafter referred to as the modified region.

The pulse picker controller 24 refers to a processing pattern signal S2 output from the processing controller 26, and generates a pulse picker drive signal S3 synchronized with the clock signal S1. The processing pattern signal S2 is generated by referring to the processing table stored in the processing table unit 30. In the processing table, the irradiation pattern information is described as the numbers of light pulses on a light pulse basis. Based on the pulse picker drive signal S3, the pulse picker 14 performs an operation to switch the pulse laser beam PL1 between passing and blocking (ON/OFF) in synchronization with the clock signal S1.

Through the operation of the pulse picker 14, the modulated pulse laser beam PL2 is generated. There are delay times $t_2$ and $t_3$ between the rising edges of the clock signal S1 and the rising and falling edges of the pulse picker drive signal S3. Also, there are delay times $t_4$ and $t_5$ between the rising and falling edges of the pulse picker drive signal S3 and the pulse picker operation.

When the substrate to be processed is processed, the timing to generate the pulse picker drive signal S3 and the like, and the timing to move the substrate to be processed and the pulse laser beam in relation to each other are determined by taking the delay times $t_1$ through $t_5$ into consideration.

FIG. 5 is a diagram showing the pulse picker operation and the timing of the modulated pulse laser beam PL2 according to the laser dicing method of this embodiment. On a light pulse basis, the pulse picker operation is switched in synchronization with the clock signal S1. As the oscillation of the pulse laser beam and the pulse picker operation are synchronized with the same clock signal S1, an irradiation pattern on a light pulse basis can be realized.

Specifically, irradiation and non-irradiation with the pulse laser beam are performed under predetermined conditions defined by the numbers of light pulses. That is, the pulse picker operation is performed based on the number of irradiating light pulses (P1) and the number of non-irradiating light pulses (P2), so as to switch between irradiation and non-irradiation of the substrate to be processed. The value P1 and the value P2 defining the irradiation pattern of the pulse laser beam are described as the irradiated region register setting and the non-irradiated region register setting in the processing table, for example. In accordance with the material of the substrate to be processed and the conditions of the laser beam, the value P1 and the value P2 are set under predetermined conditions so that the crack formation at the time of dicing is optimized.

The modulated pulse laser beam PL2 is turned into the pulse laser beam PL3 shaped into a desired form by the beam shaper 16. Further, the shaped pulse laser beam PL3 is collected by the collector lens 18, and is turned into the pulse laser beam PL4 having a desired beam diameter. The pulse laser beam PL4 is emitted onto the wafer that is the substrate to be processed.

In a case where the wafer is diced in the X-axis direction and the Y-axis direction, the XYZ stage is first moved in the X-axis direction at a constant speed, and scanning is performed with the pulse laser beam PL4. After the desired dicing in the X-axis direction is completed, the XYZ stage is moved in the Y-axis direction at a constant speed, and scanning is performed with the pulse laser beam PL4. In this manner, the dicing in the Y-axis direction is performed.

The intervals between irradiation and non-irradiation with the pulse laser beam are controlled by the above described number of irradiating light pulses (P1), the number of non-irradiating light pulses (P2), and the moving speed of the stage.

As for the Z-axis direction (the height direction), the collecting position (focal position) of the collector lens is adjusted to a predetermined depth in the wafer. The predetermined depth is set so that cracks are formed in desired shapes at the time of dicing.

Where n represents the refractive index of the substrate to be processed,
L represents the processing position with respect to the surface of the substrate to be processed, and
Lz represents the Z-axis displacement distance, the following equation is established:

$$Lz=L/n$$

That is, where the surface of the substrate to be processed is the initial Z-axis position of the collecting position of the collector lens, the collecting position should be displaced in the Z-axis by "Lz" when processing is performed on a position at the depth "L" from the substrate surface.

Figure 6:
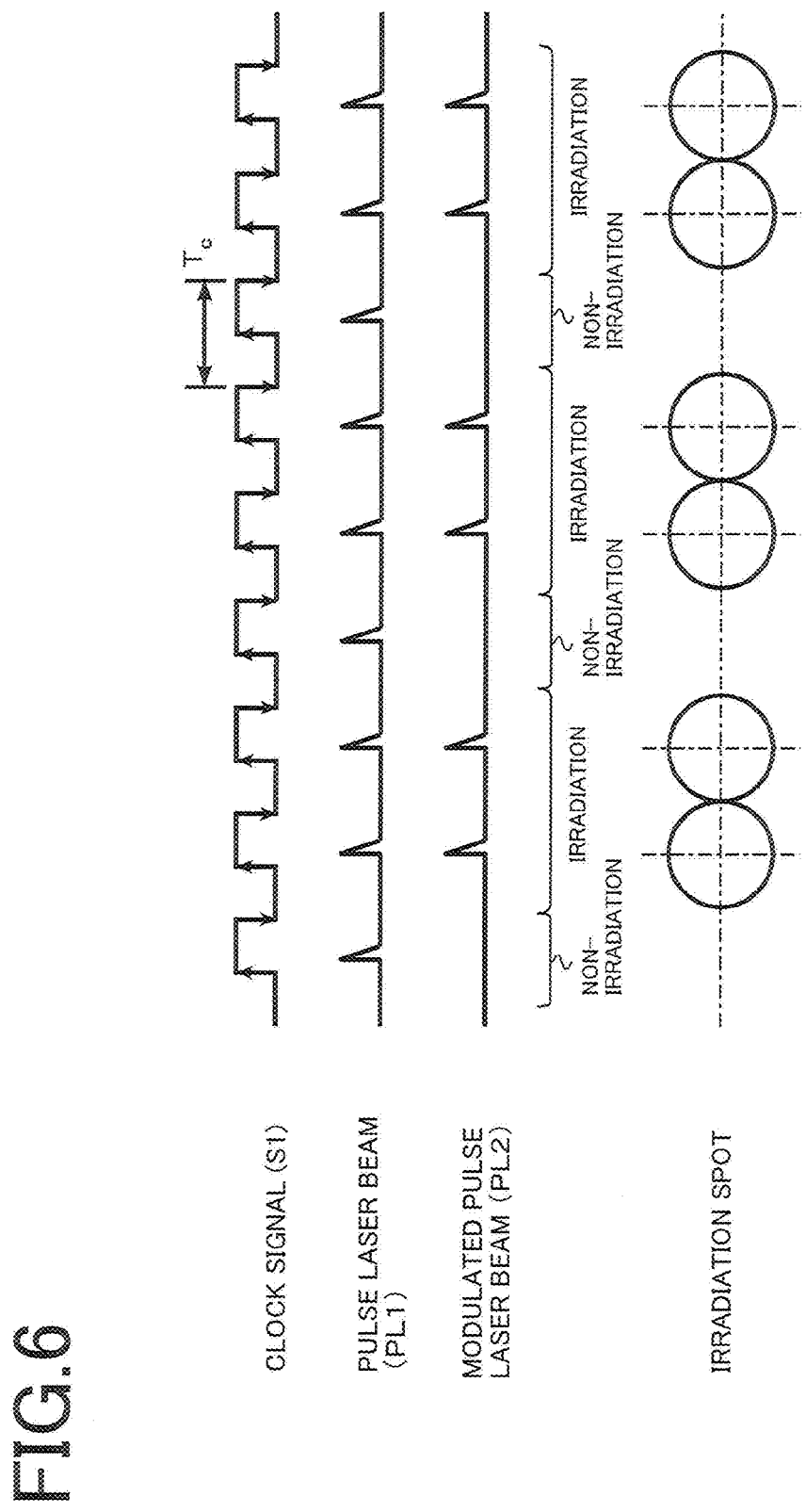
FIG. 6 is a diagram for explaining the irradiation pattern according to the laser dicing method of the first embodiment.

FIG. 6 is a diagram for explaining the irradiation pattern according to the laser dicing method of this embodiment. As shown in the drawing, the pulse laser beam PL1 is generated in synchronization with the clock signal S1. Passing and blocking of the pulse laser beam are then controlled in synchronization with the clock signal S1. In this manner, the modulated pulse laser beam PL2 is generated.

As the stage is moved in a horizontal direction (in the X-axis or Y-axis direction), the irradiating light pulses of the modulated pulse laser beam PL2 are formed as irradiation spots on the wafer. By generating the modulated pulse laser beam PL2 in this manner, irradiation spots are controlled on a light pulse basis, and are intermittently formed on the wafer. In the example illustrated in FIG. 6, the number of irradiating light pulses (P1) is 2, the number of non-irradiating light pulses (P2) is 1, and such conditions are set that the irradiating light pulse (Gaussian beam) is switched back and forth between irradiation and non-irradiation at the pitch equivalent to the spot diameter.

If processing is performed with a beam spot diameter D (μm) and a repetition frequency F (KHz), the stage moving velocity V (m/sec) for repetitively switching the irradiating light pulse between irradiation and non-irradiation at the pitch equivalent to the spot diameter is expressed as follows:

$$V = D \times 10^{-6} \times F \times 10^3$$

For example, if processing is performed with a beam spot diameter D of 2 μm and a repetition frequency F of 50 KHz, the stage moving velocity V is expressed as follows:

$$V = 100 \text{ mm/sec}$$

Also, where the power of the irradiating light is represented by P (watt), light pulses having an irradiation pulse energy P/F per pulse are emitted onto the wafer.

The parameters such as the irradiation energy of the pulse laser beam (the power of the irradiating light), the depth of the processing point of the pulse laser beam, and the intervals between irradiation and non-irradiation with the pulse laser beam are determined so that a series of cracks are formed in the surface of the substrate to be processed.

Figure 7:
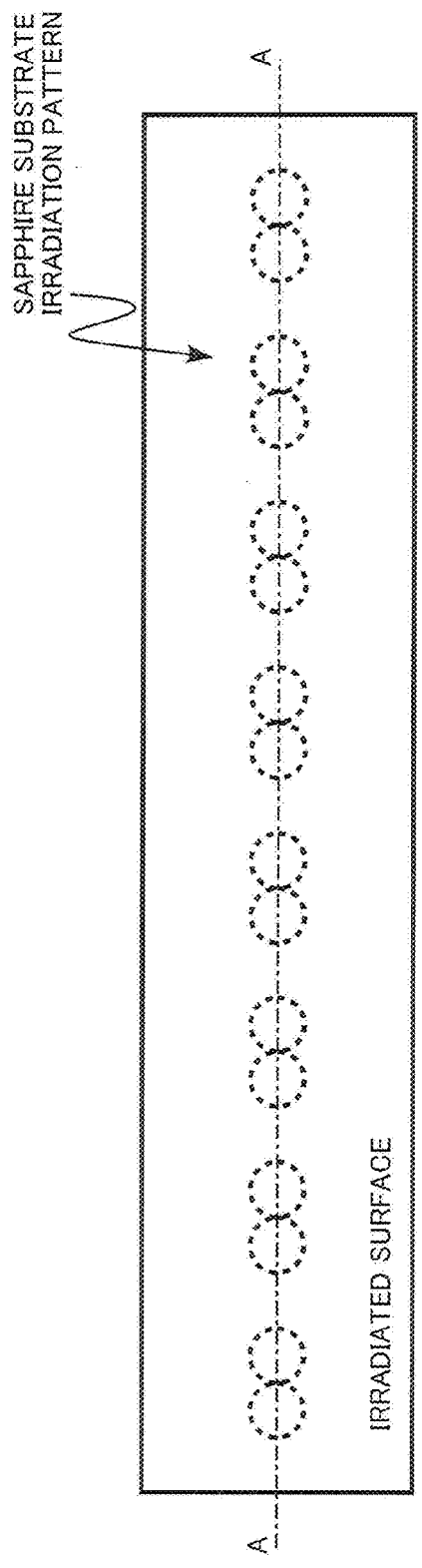
FIG. 7 is a top view showing an irradiation pattern formed on a sapphire substrate of the first embodiment.
Figure 8:
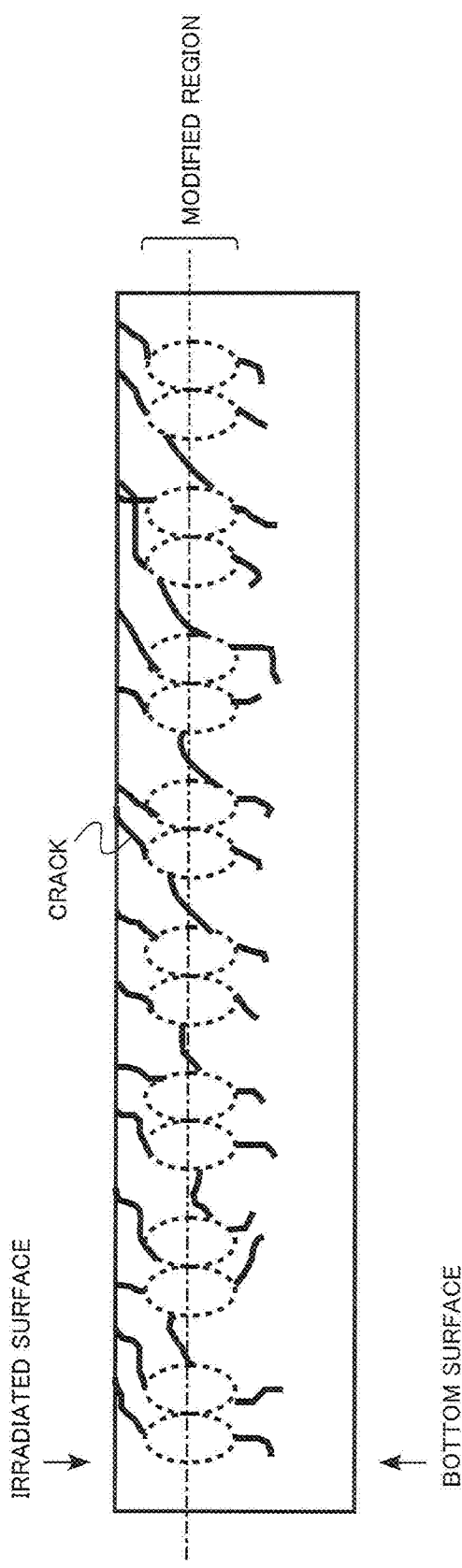
FIG. 8 is a cross-sectional view taken along the line A-A of FIG. 7.
Figure 9:
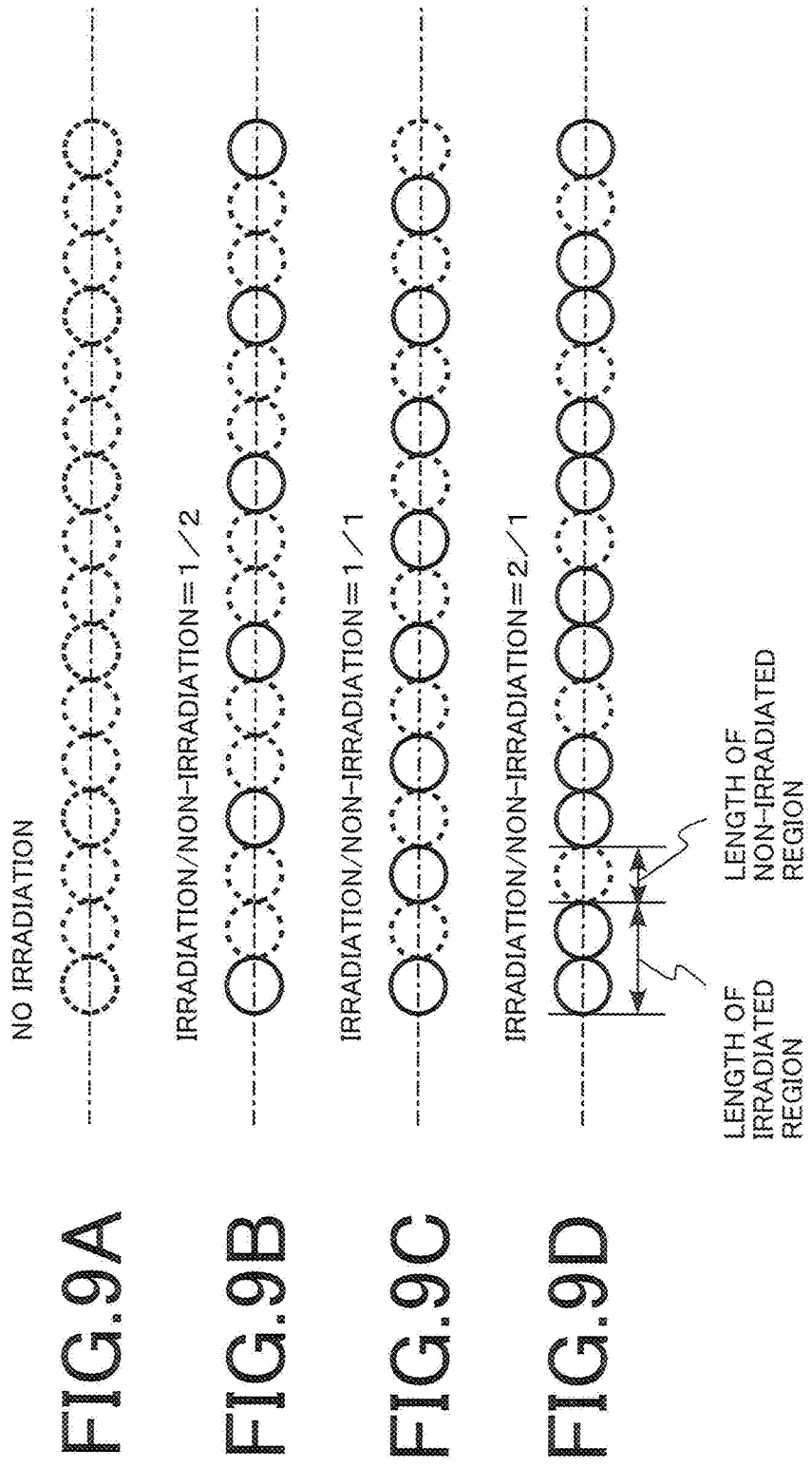
FIGS. 9A through 9D are diagrams for explaining the effects of the first embodiment.

FIG. 7 is a top view showing the irradiation pattern formed on a sapphire substrate. When seen from above the irradiated surface, irradiation spots are formed at the pitch equivalent to the irradiation spot diameter, with the number of irradiating light pulses (P1) being 2, the number of non-irradiating light pulses (P2) being 1. FIG. 8 is a cross-sectional view taken along the line A-A of FIG. 7. As shown in the drawing, a modified region is formed inside the sapphire substrate. Cracks that extend from the modified region to the substrate surface are formed along the light pulse scanning lines. The cracks are also formed in series in the surface of the substrate to be processed.

FIGS. 9A through 9D are diagrams for explaining the effects of this embodiment. The dotted line circles in FIG. 9A indicate the possible irradiation positions in a case where a pulse laser beam is emitted at a highest possible laser frequency of the pulse laser beam and at the highest possible stage moving velocity, for example. FIG. 9B shows the irradiation pattern seen in a case where the ratio between irradiation and non-irradiation is 1/2. The solid line circles indicate the irradiation positions, and the dotted line circles indicate the non-irradiation positions.

Here, higher dicing properties are hypothetically achieved where the distance between each two irradiation spots (or the length of each non-irradiated region) is made shorter. Such a case can be realized by setting the ratio between irradiation and non-irradiation at 1/1, without a change in stage moving velocity, as shown in FIG. 9C. If a pulse picker is not used as in this embodiment, the stage moving velocity needs to be lowered to obtain the same conditions as above, and the dicing processing throughput becomes lower.

Next, higher dicing properties are hypothetically achieved where irradiation spots are successively formed to make each irradiated region longer. Such a case can be realized by setting the ratio between irradiation and non-irradiation at 2/1, without a change in the stage moving velocity, as shown in FIG. 9D. If a pulse picker is not used as in this embodiment, the stage moving velocity needs to be lowered and varied to obtain the same conditions as above. As a result, the dicing processing throughput becomes lower, and the control operation becomes extremely difficult. In the irradiation pattern shown in FIG. 9B, conditions similar to those in FIG. 9D may be realized by increasing the irradiation energy. In such a case, however, the laser power gathered to one point becomes larger. As a result, the crack width might become greater, or the linearity of the cracks might be degraded. Also, where LEDs are formed in the sapphire substrate, the amount of laser that reaches the LED region on the opposite side of the cracks might increase, and the LED devices might be degraded.

As described above, according to this embodiment, various conditions for dicing can be realized, without a change in the laser beam conditions and the stage moving velocity. Accordingly, optimum conditions for dicing can be found, without degradation in productivity and device characteristics.

It should be noted that, in this specification, the "length of each irradiated region" and the "length of each non-irradiated region" are the respective lengths shown in FIG. 9D.

Figure 10:
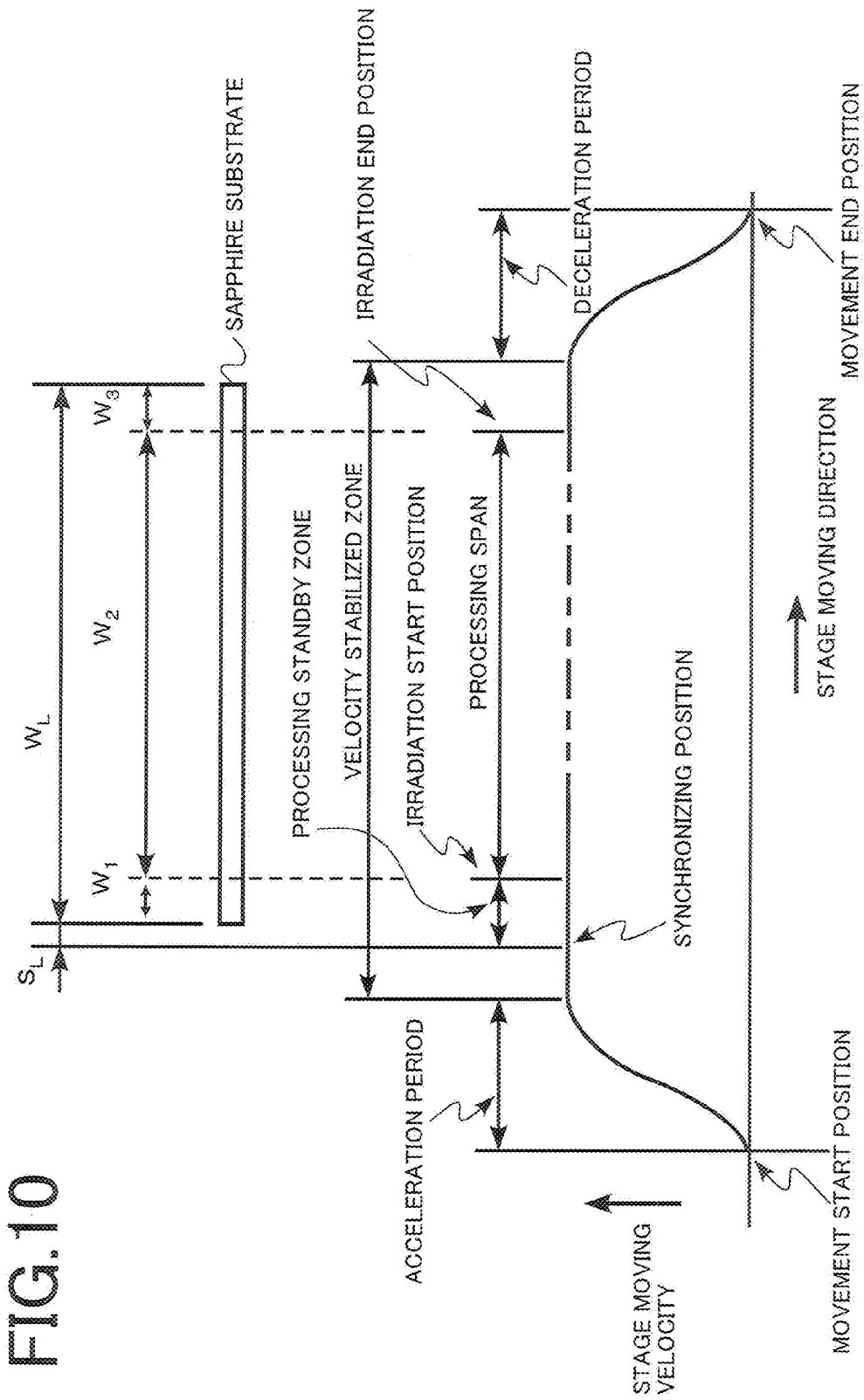
FIG. 10 is a diagram for explaining the relationship between stage movement and dicing in the first embodiment.

FIG. 10 is a diagram for explaining the relationship between the stage movement and the dicing. A position sensor that detects displacement positions in the X-axis and Y-axis directions is provided in the XYZ stage. For example, the point at which the stage moving velocity enters a velocity stabilized zone after the stage starts moving in the X-axis or Y-axis direction is set as a synchronizing position in advance. When the position sensor detects the synchronizing position, the displacement position detection signal S4 (see FIG. 3) is sent to the pulse picker controller 24, so that the pulse picker operation is allowed, and the pulse picker 14 is activated by the pulse picker drive signal S3. The synchronizing position may be set on an end face of the substrate to be processed, and the position sensor may detect the end face, for example.

In this manner, the following parameters are managed:
$S_L$: distance from the synchronizing position to the substrate
$W_L$: processing length
$W_1$: distance from a substrate end to the irradiation start position
$W_2$: processing span
$W_3$: distance from the irradiation end position to the other substrate end In the above described manner, the stage position and the operation start position of the pulse picker 14 are synchronized with each other. That is, irradiation and non-irradiation with the pulse laser beam are synchronized with the position of the stage. Accordingly, during the irradiation and non-irradiation with the pulse laser beam, a constant stage moving velocity is guaranteed (or the stage is in the velocity stabilized zone). Thus, regularity is kept among the positions of irradiation spots, and stable crack formation is realized.

In a case where a thick substrate is to be processed, cracks are formed by applying pulse laser beams having processing points at different depths along the same scanning line in a substrate several times (or through several layers). In this manner, the dicing properties may be improved. In such a case, the stage position and the pulse picker operation start position are synchronized with each other, so that the relationship with the pulse-irradiated positions can be accurately and desirably controlled in scanning operations at different depths. Accordingly, the conditions for dicing can be optimized.

FIGS. 11A and 11B are diagrams for explaining cases where cracks are formed by applying pulse laser beams having processing points at different depths along the same scanning line in a substrate several times. FIGS. 11A and 11B are schematic views of irradiation patterns in cross-section surfaces of substrates. The shaded portions (ON) indicate irradiated regions, and unshaded portions (OFF) indicate non-irradiated regions. FIG. 11A illustrates a case where the first layer and the second layer that are irradiated are in the same phase, or the pulse irradiated positions are the same between the first layer and the second layer. FIG. 11B illustrates a case where the first layer and the second layer that are irradiated are in different phases, or where the pulse irradiated positions in the second layer do not match the respective irradiated pulse positions in the first layer.

FIGS. 12A and 12B are optical photographs of diced faces formed under the conditions illustrated in FIGS. 11A and 11B, respectively. FIG. 12A illustrates the case of layers in the same phase, and FIG. 12B illustrates the case of layers in different phases. The upper part of each photograph is shown at a low magnification, and the lower part of each photograph is shown at a high magnification. As the stage position and the pulse picker operation start position are synchronized with each other as described above, the relationship between the first layer and the second layer that are irradiated can be accurately controlled.

The processed substrate shown in each of FIGS. 12A and 12B is a 150-μm thick sapphire substrate. In this case, the dicing force required for the dicing was 0.31 N in the case of layers in the same phase, and was 0.38 N in the case of layers in different phases. In view of this, the dicing properties were higher in the case of the same phase.

Although the number of irradiating light pulses and the number of non-irradiating light pulses in the first layer are the same as those in the second layer in the above described examples, optimum conditions can also be set where the number of irradiating light pulses and the number of non-irradiating light pulses in the first layer differ from those in the second layer.

To further improve the accuracy of the irradiation spot positions, movement of the stage is preferably also synchronized with the clock signal. This can be realized by synchronizing the stage movement signal S5 (see FIG. 3) sent from the processing controller 26 to the XYZ stage unit 20 with the clock signal S1, for example.

According to the laser dicing method of this embodiment, a series of cracks that reach the substrate surface and are arranged in the surface of the substrate to be processed. In this manner, the later dicing of the substrate is facilitated. Accordingly, the productivity by the dicing becomes higher. The final dicing of the substrate after the formation of the cracks, or the dividing of the wafer into individual LED chips may be spontaneously realized after the formation of the cracks or may be realized through further application of a human force.

By a method of continuously emitting a pulse laser beam onto a substrate as in conventional cases, it is difficult to control the cracks formed in series in the substrate surface to have desired shapes, even if the stage moving velocity, the numerical aperture of the collector lens, the irradiation light power, and the like are optimized. In this embodiment, the irradiation pattern is optimized by intermittently switching the pulse laser beam between irradiation and non-irradiation on a light pulse basis. In this manner, the cracks are prevented from reaching the substrate surface, and a laser dicing method for achieving excellent dicing properties is realized.

That is, linear and narrow cracks can be formed in series along the laser scanning lines in the substrate surface, for example. By forming such linear cracks in series, the influence of the cracks on devices such as the LEDs formed in the substrate can be minimized at the time of dicing. Also, since the linear cracks can be formed, each region in which a crack is formed can be made narrower in the substrate surface. Accordingly, the dicing width can be made smaller in the designing process. Thus, the number of device chips formed in the same substrate or wafer can be increased, which contributes to a reduction of device manufacturing costs.

EXAMPLES

The following is a description of examples of laser-processed portions according to this embodiment.

Example 1

Figure 13:
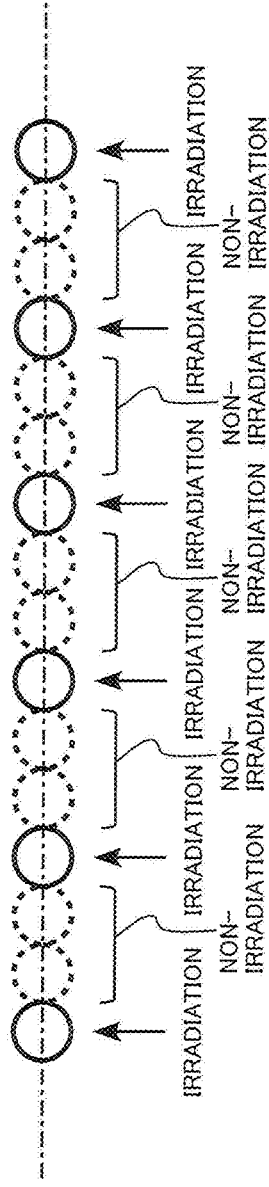
FIG. 13 is a diagram showing the irradiation pattern of Example 1.

According to the method of this embodiment, laser dicing was performed under the following conditions:
Substrate to be processed: sapphire substrate, 100 μm in substrate thickness
Laser source: Nd:YVO$_4$ laser
Wavelength: 532 nm
Irradiation energy: 50 mW
Laser frequency 20 KHz
Number of irradiating light pulses (P1): 1
Number of non-irradiating light pulses (P2): 2
Stage moving velocity: 25 mm/sec
Processing point depth: 25.2 μm from the surface of the substrate to be processed FIG. 13 shows the irradiation pattern of Example 1. As shown in the drawing, one pulse region is irradiated with a light pulse, two regions equivalent to two light pulses are not irradiated. This condition will be hereinafter indicated as "irradiation/non-irradiation=1/2". It should be noted that the pitch of irradiation and non-irradiation is equivalent to the spot diameter.

In Example 1, the spot diameter was approximately 1.2 μm. Accordingly, the pitch of irradiation was approximately 3.6 μm.

Figure 14:
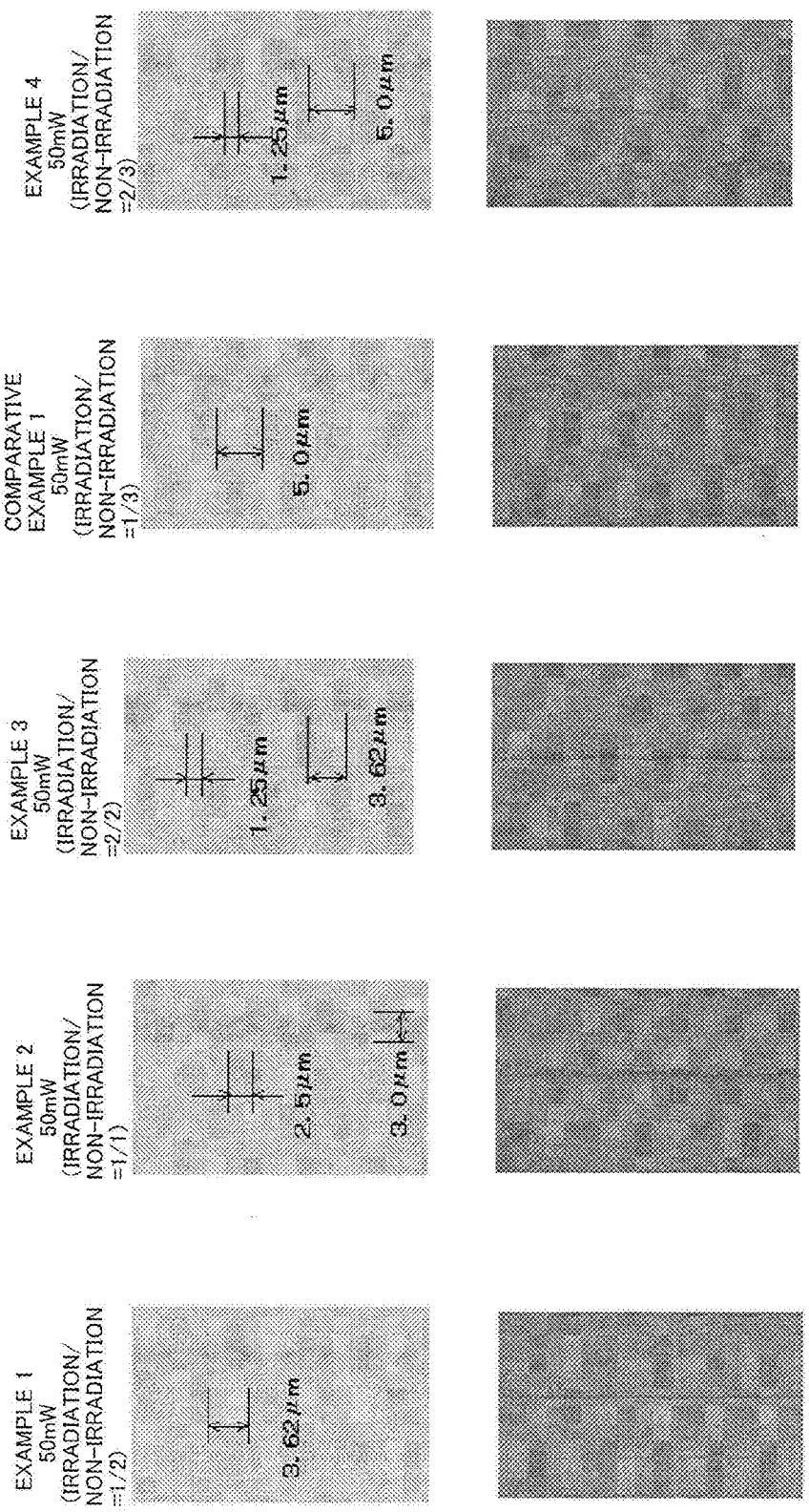
FIGS. 14A through 14E show the results of laser dicing operations of Examples 1 through 4 and Comparative Example 1.
Figure 15:
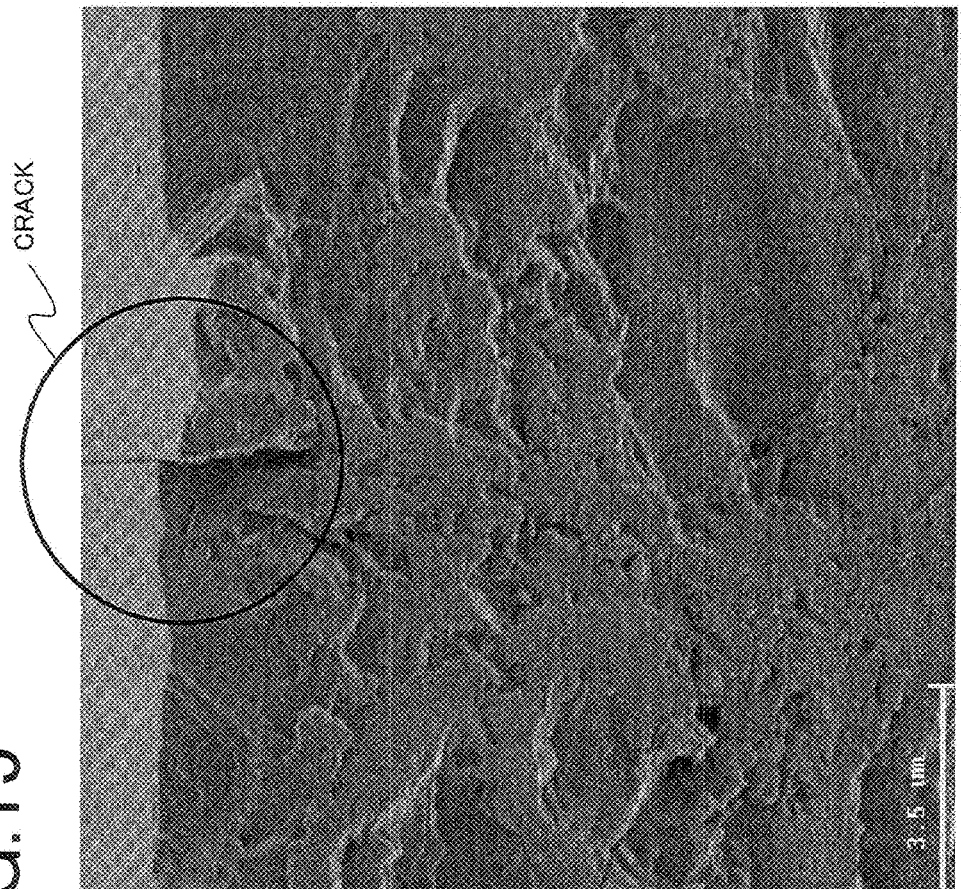
FIG. 15 is a cross-sectional view showing the result of the laser dicing operation of Example 1.

FIG. 14A shows the result of the laser dicing. The upper half of the drawing is an optical photograph of the upper surface of the substrate, and the lower half is an optical photograph of the upper surface of the substrate at a lower magnification than that used in the upper optical photograph. The upper optical photograph was taken by adjusting the focal point in the modified regions in the substrate. The lower optical photograph was taken by adjusting the focal point in the cracks in the surface of the substrate. FIG. 15 is a cross-sectional SEM photograph of the substrate taken in a direction perpendicular to the cracks.

The substrate to be processed had a reed-like shape of about 5 mm in width, and was irradiated with a pulse laser beam in a direction perpendicular to the extending direction of the reed-like shape, to form the cracks. After the cracks were formed, the dicing force required for dicing with a breaker was evaluated.

Example 2

Laser dicing was performed in the same manner as in Example 1, except that the "irradiation/non-irradiation" was 1/1. FIG. 14B shows the result of the laser dicing. The upper half of the drawing is an optical photograph of the upper surface of the substrate, and the lower half is an optical photograph of the upper surface of the substrate at a lower magnification than that used in the upper optical photograph.

Example 3

Laser dicing was performed in the same manner as in Example 1, except that the "irradiation/non-irradiation" was 2/2. FIG. 14C shows the result of the laser dicing. The upper half of the drawing is an optical photograph of the upper surface of the substrate, and the lower half is an optical photograph of the upper surface of the substrate at a lower magnification than that used in the upper optical photograph.

Example 4

Laser dicing was performed in the same manner as in Example 1, except that the "irradiation/non-irradiation" was 2/3. FIG. 14E shows the result of the laser dicing. The upper half of the drawing is an optical photograph of the upper surface of the substrate, and the lower half is an optical photograph of the upper surface of the substrate at a lower magnification than that used in the upper optical photograph.

Comparative Example 1

Laser dicing was performed in the same manner as in Example 1, except that the "irradiation/non-irradiation" was 1/3. FIG. 14D shows the result of the laser dicing. The upper half of the drawing is an optical photograph of the upper surface of the substrate, and the lower half is an optical photograph of the upper surface of the substrate at a lower magnification than that used in the upper optical photograph.

In each of Examples 1 through 4, the irradiation energy of the pulse laser beam, the processing point depth, and the pitch of irradiation and non-irradiation were set as described above, so that the series of cracks were formed in the surface of the substrate to be processed, as shown in FIGS. 14A through 14E and FIG. 15.

Particularly, under the conditions set in Example 1, very linear cracks were formed in the surface of the substrate to be processed. Further, the smallest dicing force was required for dicing the substrate under the conditions set in Example 1. Therefore, in a case where the substrate to be processed is a sapphire substrate, it is preferable to set the respective parameters as follows, with the controllability over the respective conditions being taken into consideration. The irradiation energy is 50±5 mW. The processing point depth is 25.0±2.5 µm. The pitch of irradiation is set at 3.6±0.4 µm by allowing one light pulse of the pulse laser beam to pass at a time, and blocking two light pulses at a time.

In Example 3, on the other hand, the modified regions were located close to each other, and cracks were formed between the modified regions in the substrate. As a result, the cracks in the surface formed S-shapes, and each region in which a crack was formed tended to become wider. This is supposedly because the power of the laser beam collected in each small region was too high.

In Comparative Example 1, the conditions were not optimized, and cracks were not formed in series in the substrate surface. Therefore, it was impossible to evaluate the dicing force.

Example 5

According to the method of this embodiment, laser dicing was performed under the following conditions:
Substrate to be processed: sapphire substrate, 100 µm in substrate thickness
Laser source: Nd:YVO$_4$ laser
Wavelength: 532 nm
Irradiation energy: 90 mW
Laser frequency 20 KHz
Number of irradiating light pulses (P1): 1
Number of non-irradiating light pulses (P2): 1
Stage moving velocity: 25 mm/sec FIG. 16A shows the result of the laser dicing. The upper half of the drawing is an optical photograph of the upper surface of the substrate, and the lower half is an optical photograph of the upper surface of the substrate at a lower magnification than that used in the upper optical photograph. The upper optical photograph was taken by adjusting the focal point in the modified regions in the substrate. The lower optical photograph was taken by adjusting the focal point in the cracks in the surface of the substrate.

Example 6

Laser dicing was performed in the same manner as in Example 5, except that the "irradiation/non-irradiation" was 1/2. FIG. 16B shows the result of the laser dicing. The upper half of the drawing is an optical photograph of the upper surface of the substrate, and the lower half is an optical photograph of the upper surface of the substrate at a lower magnification than that used in the upper optical photograph.

Example 7

Laser dicing was performed in the same manner as in Example 5, except that the "irradiation/non-irradiation" was 2/2. FIG. 16C shows the result of the laser dicing. The upper half of the drawing is an optical photograph of the upper surface of the substrate, and the lower half is an optical photograph of the upper surface of the substrate at a lower magnification than that used in the upper optical photograph.

Example 8

Laser dicing was performed in the same manner as in Example 5, except that the "irradiation/non-irradiation" was 1/3. FIG. 16D shows the result of the laser dicing. The upper half of the drawing is an optical photograph of the upper surface of the substrate, and the lower half is an optical photograph of the upper surface of the substrate at a lower magnification than that used in the upper optical photograph.

Example 9

Laser dicing was performed in the same manner as in Example 5, except that the "irradiation/non-irradiation" was 2/3. FIG. 16E shows the result of the laser dicing. The upper half of the drawing is an optical photograph of the upper surface of the substrate, and the lower half is an optical photograph of the upper surface of the substrate at a lower magnification than that used in the upper optical photograph.

Example 10

Laser dicing was performed in the same manner as in Example 5, except that the "irradiation/non-irradiation" was 2/3. FIG. 16F shows the result of the laser dicing. The upper half of the drawing is an optical photograph of the upper surface of the substrate, and the lower half is an optical photograph of the upper surface of the substrate at a lower magnification than that used in the upper optical photograph.

In each of Examples 5 through 10, the irradiation energy of the pulse laser beam, the processing point depth, and the pitch of irradiation and non-irradiation were set as described above, so that the series of cracks were formed in the surface of the substrate to be processed, as shown in FIGS. 16A through 16F.

Particularly, under the conditions set in Example 8, relatively linear cracks were formed in the surface of the substrate to be processed. The required dicing force was also small under the conditions set in Example 8. However, the cracks in the surface formed larger S-shapes, and each region in which a crack was formed tended to become wider, compared with the cases where the irradiation energy was 50 mW as in Examples 1 through 4. This is supposedly because, in the case of 90 mW, the power of the laser beam collected in each small region was too high, compared with the case of 50 mW.

Example 11

According to the method of this embodiment, laser dicing was performed under the following conditions:
Substrate to be processed: sapphire substrate, 100 μm in substrate thickness
Laser source: Nd:YVO$_4$ laser
Wavelength: 532 nm
Irradiation energy: 50 mW
Laser frequency 20 KHz
Number of irradiating light pulses (P1): 1
Number of non-irradiating light pulses (P2): 2
Stage moving velocity: 25 mm/sec
Processing point depth: about 15.2 μm from the surface of the substrate to be processed
Dicing was performed where the processing point depth was smaller than that is Example 1 by 10 μm, or the collecting position of the pulse laser beam was closer to the surface of the substrate to be processed than that in Example 1.

FIG. 17A shows the result of the laser dicing. The photograph was taken by adjusting the focal point in the modified regions in the substrate. In the photograph, the line on the right-hand side indicates the cracks formed under the conditions (+10 μm) set in Example 11. For a comparison purpose, the cracks formed under the conditions with a different processing point depth (0) set in Example 1 are shown on the left-hand side.

Example 12

Laser dicing was performed in the same manner as in Example 11, except that the "irradiation/non-irradiation" was 1/1. FIG. 17B shows the result of the laser dicing.

Example 13

Laser dicing was performed in the same manner as in Example 11, except that the "irradiation/non-irradiation" was 2/2. FIG. 17C shows the result of the laser dicing.

Example 14

Laser dicing was performed in the same manner as in Example 11, except that the "irradiation/non-irradiation" was 1/3. FIG. 17D shows the result of the laser dicing.

Example 15

Laser dicing was performed in the same manner as in Example 11, except that the "irradiation/non-irradiation" was 2/3. FIG. 17E shows the result of the laser dicing.

In each of Examples 11 through 15, the irradiation energy of the pulse laser beam, the processing point depth, and the pitch of irradiation and non-irradiation were set as described above, so that the series of cracks were formed in the surface of the substrate to be processed, as shown in FIGS. 17A through 17E.

However, compared with the cases of Examples 1 through 4, larger cracks of the modified regions were exposed through the surface. The cracks in the surface formed S-shapes, and each region in which a crack was formed tended to become wider.

Through the above described examples, it has become apparent that, by controlling the irradiation energy of the pulse laser beam, the processing point depth of the pulse laser beam, and the pitch of irradiation and non-irradiation with the pulse laser beam, the cracks can be formed in series in the surface of the substrate to be processed, and a laser dicing method that achieved excellent dicing properties can be provided.

Example 16

According to the method of this embodiment, laser dicing was performed under the following conditions:
Substrate to be processed: sapphire substrate, 100 μm in substrate thickness
Laser source: Nd:YVO$_4$ laser
Wavelength: 532 nm
Irradiation energy: 90 mW
Laser frequency 20 KHz
Number of irradiating light pulses (P1): 1
Number of non-irradiating light pulses (P2): 1
Stage moving velocity: 25 mm/sec
Dicing was performed where the processing point depth was smaller than that is Example 5 by 10 μm, or the collecting position of the pulse laser beam was closer to the surface of the substrate to be processed than that in Example 5.

Figure 18A:
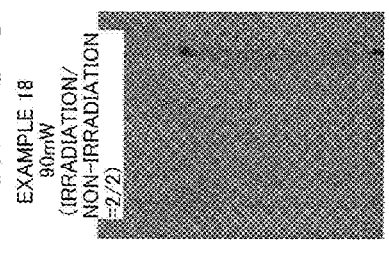
FIGS. 18A through 18F show the results of laser dicing operations of Examples 16 through 21.

FIG. 18A shows the result of the laser dicing. The photograph was taken by adjusting the focal point in the modified regions in the substrate. In the photograph, the line on the right-hand side indicates the cracks formed under the conditions (+10 μm) set in Example 16. For a comparison purpose, the cracks formed under the conditions with a different processing point depth (0) set in Example 5 are shown on the left-hand side.

Example 17

Figure 18B:
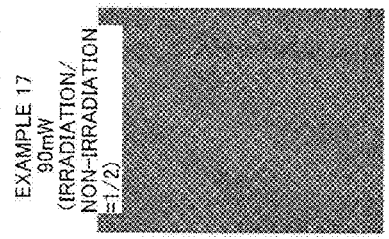

Laser dicing was performed in the same manner as in Example 16, except that the "irradiation/non-irradiation" was 1/2. FIG. 18B shows the result of the laser dicing.

Example 18

Figure 18C:
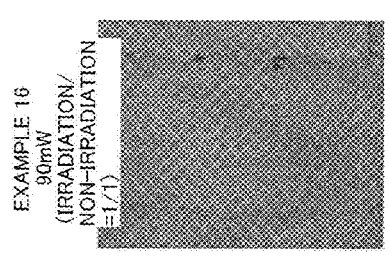

Laser dicing was performed in the same manner as in Example 16, except that the "irradiation/non-irradiation" was 2/2. FIG. 18C shows the result of the laser dicing.

Example 19

Figure 18D:
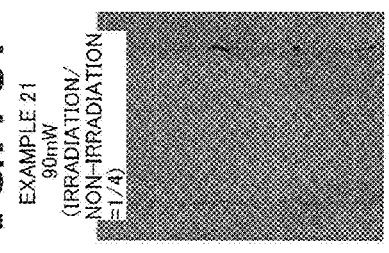

Laser dicing was performed in the same manner as in Example 16, except that the "irradiation/non-irradiation" was 1/3. FIG. 18D shows the result of the laser dicing.

Example 20

Figure 18E:
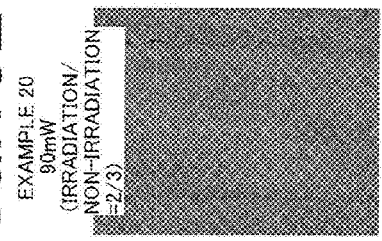

Laser dicing was performed in the same manner as in Example 16, except that the "irradiation/non-irradiation" was 2/3. FIG. 18E shows the result of the laser dicing.

Example 21

Figure 18F:
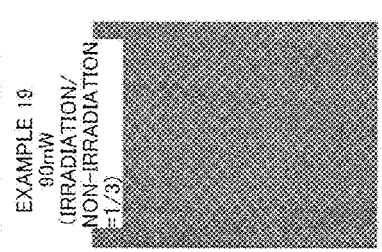

Laser dicing was performed in the same manner as in Example 16, except that the "irradiation/non-irradiation" was 1/4. FIG. 18F shows the result of the laser dicing. In each of Examples 16 through 21, the irradiation energy of the pulse laser beam, the processing point depth, and the pitch of irradiation and non-irradiation were set as described above, so that the series of cracks were formed in the surface of the substrate to be processed, as shown in FIGS. 18A through 18F.

However, compared with the cases of Examples 5 through 10, larger cracks of the modified regions were exposed through the surface. The cracks in the surface formed S-shapes, and each region in which a crack was formed tended to become wider. As a result, the diced portions also had S-shapes after the dicing.

Through the evaluations on Examples 1 through 21 and Comparative Example 1, it has become apparent that, where the thickness of the substrate to be processed is 100 μm, the conditions set in Example 1, which forms diced portions with excellent linearity as well as cracks with excellent linearity, and requires only a small dicing force, are the optimum conditions.

Example 22

According to the method of this embodiment, laser dicing was performed under the following conditions:
Substrate to be processed: sapphire substrate, 150 μm in substrate thickness
Laser source: Nd:YVO$_4$ laser
Wavelength: 532 nm
Irradiation energy: 200 mW
Laser frequency 200 KHz
Number of irradiating light pulses (P1): 1
Number of non-irradiating light pulses (P2): 2
Stage moving velocity: 5 mm/sec
Processing point depth: about 23.4 μm from the surface of the substrate to be processed While the substrate to be processed is a 100-μm thick sapphire substrate in each of Examples 1 through 21, the substrate to be processed is a 150-μm sapphire substrate in this example. FIG. 19A shows the result of the laser dicing. The upper half of the drawing is an optical photograph of a diced face of the substrate, and the lower half is a schematic view of the irradiation pattern in a cross-section surface of the substrate. The shaded portions (ON) indicate irradiated regions, and unshaded portions (OFF) indicate non-irradiated regions.

The substrate to be processed had a reed-like shape of about 5 mm in width, and was irradiated with a pulse laser beam in a direction perpendicular to the extending direction of the reed-like shape, to form the cracks. After the cracks were formed, the dicing force required for dicing with a breaker was evaluated.

Example 23

Laser dicing was performed in the same manner as in Example 22, except that the "irradiation/non-irradiation" was 2/4. FIG. 19B shows the result of the laser dicing.

Example 24

Laser dicing was performed in the same manner as in Example 22, except that the "irradiation/non-irradiation" was 3/5. FIG. 19C shows the result of the laser dicing.

The linearity of the cracks was almost the same between Examples 22 and 23, and the linearity of the diced portions seen after the dicing was almost the same between Examples 22 and 23. The dicing force required for dicing was 2.39 to 2.51 N in Example 22, 2.13 to 2.80 N in Example 23, and 1.09 to 1.51 N in Example 24. As a result, it has become apparent that the required dicing force is the smallest under the conditions set in Example 24 in which "irradiation/non-irradiation" is 3/5. Therefore, in a case where the thickness of the substrate to be processed is 150 μm, the conditions set in Example 24 are the optimum conditions.

Through the above described examples, it has become apparent that optimum dicing properties can be achieved by controlling irradiation and non-irradiation with the pulse laser beam, as well as the irradiation energy of the pulse laser beam, the processing point depth of the pulse laser beam, and the like, in synchronization with the processing control clock signal with which the pulse laser beam is also synchronized, and the pulse laser beam is switched between irradiation and non-irradiation on a light pulse basis.

In the above examples, the thickness of the substrate to be processed is 100 μm or 150 μm. However, optimum dicing properties can also be achieved with a thicker substrate to be processed, such as a 200- or 250-μm thick substrate.

(Second Embodiment)

A dicing method according to this embodiment is a method of dicing a substrate to be processed that has devices formed therein and also has a metal film formed on one surface thereof. The substrate to be processed is placed on a first stage, and the metal film is removed by metal processing with the use of a diamond tool. The substrate to be processed is then placed on a second stage. A clock signal is generated, and a pulse laser beam synchronized with the clock signal is emitted. Scanning in a one-dimensional direction with a pulse picker and a laser beam scanner is then performed on the surface of the object to be processed, while the pulse laser beam is switched between passing and blocking in synchronization with the clock signal. After the scanning is performed with the pulse laser beam in the one-dimensional direction, the second stage is moved in a direction perpendicular to the one-dimensional direction, and scanning with the pulse laser beam in the one-dimensional direction is further performed, to form cracks that reach the substrate surface of the substrate to be processed. Based on the scanning position signal sent from the laser beam scanner, the position of the processing origin point in each scanning operation is corrected by controlling the pulse picker to pass or block the pulse laser beam.

The dicing method according to this embodiment is the same as the method according to the first embodiment, except that a pulse laser processing apparatus including a laser beam scanner is used. Therefore, explanation of the same aspects as those of the first embodiment will not be repeated.

The pulse laser processing apparatus of this embodiment synchronizes pulses of a laser oscillator, scanning by the laser beam scanner, and passing and blocking of a pulse laser beam, directly or indirectly with the same clock signal. By maintaining synchronization between the laser system and the beam scan system, the accuracy of positioning irradiation spots of the pulse laser beam is increased.

Further, passing and blocking of the pulse laser beam can be controlled, based on the number of light pulses of the pulse laser beam. With this arrangement, synchronization can be readily maintained among the pulses of the laser oscillator, the scanning by the laser beam scanner, and the passing and blocking of the pulse laser beam. Also, the structure of the control circuit can be simplified. The pulse laser processing apparatus of this embodiment can further increase the accuracy of positioning irradiation spots of the pulse laser beam, and readily realize stable fine processing and high-speed processing of the surface of the object to be processed.

Figure 20:
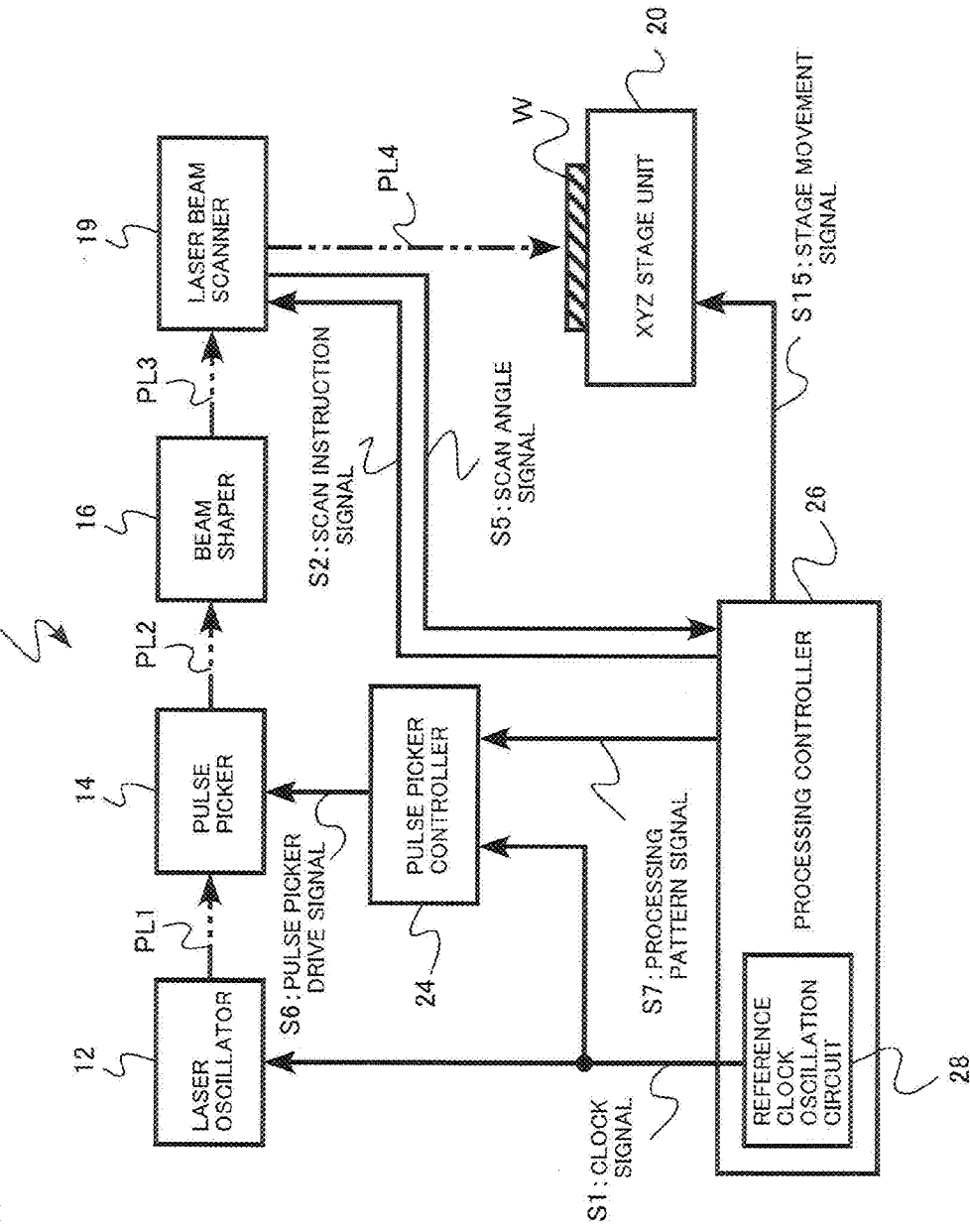
FIG. 20 is a diagram showing the structure of a pulse laser processing apparatus according to a second embodiment.

FIG. 20 is a diagram showing the structure of the pulse laser processing apparatus according to this embodiment. The pulse laser processing apparatus 10 according to this embodiment includes the following main components: a laser oscillator 12, a pulse picker 14, a beam shaper 16, a laser beam scanner 19, an XY stage unit 20, a pulse picker controller 24, and a processing controller 26. The processing controller 26 includes a reference clock oscillator circuit 28 that generates a desired clock signal S1.

The laser oscillator 12 is designed to emit a pulse laser beam PL1 synchronized with the clock signal S1 generated by the reference clock oscillation circuit 28. The laser oscillator 12 preferably oscillates a picosecond (ps) laser beam or a femtosecond (fs) laser beam that is an ultrashort pulse.

The wavelength of the laser emitted from this laser oscillator 12 is determined by taking into consideration the optical absorptance, optical reflectance, and the like of the object (substrate to be processed) to be processed.

The pulse picker 14 is provided in the light path between the laser oscillator 12 and a laser beam scanner 19. The pulse picker 14 is designed to switch the object to be processed (the workpiece W) between processing and non-processing by switching the pulse laser beam PL1 between passing and blocking (ON/OFF) in synchronization with the clock signal S1. In this manner, switching on and off of the pulse laser beam PL1 is controlled to process the object through the operation of the pulse picker 14, and the pulse laser beam PL1 turns into a modulated pulse laser beam PL2.

The pulse picker 14 is preferably formed by an acousto-optic modulator (AOM), for example. Alternatively, an electro-optic modulator (EOM) of a Raman diffraction type may be used.

The beam shaper 16 turns the incoming pulse laser beam PL2 into a pulse laser beam PL3 shaped into a desired form. For example, the beam shaper 16 may be a beam expander that enlarges a beam diameter at a certain rate. Alternatively, an optical device such as a homogenizer that uniforms the optical intensity distribution in the beam cross-section surface may be provided. Also, a device that rounds the beam cross-section, or an optical device that circularly polarizes the beam may be provided.

The laser beam scanner 19 is designed to apply the pulse laser beam PL4 only in a one-dimensional direction in synchronization with the clock signal S1. By applying the pulse laser beam PL4 in synchronization signal S1 as described above, the accuracy of positioning irradiation spots of the pulse laser beam is increased.

The accuracy of positioning the irradiation spots of the pulse laser beam can also be increased by performing only one-dimensional scanning. This is because a laser beam scanner that performs two-dimensional scanning is poorer in the beam positioning accuracy than a laser beam scanner that structurally performs only one-dimensional scanning.

Figure 21:
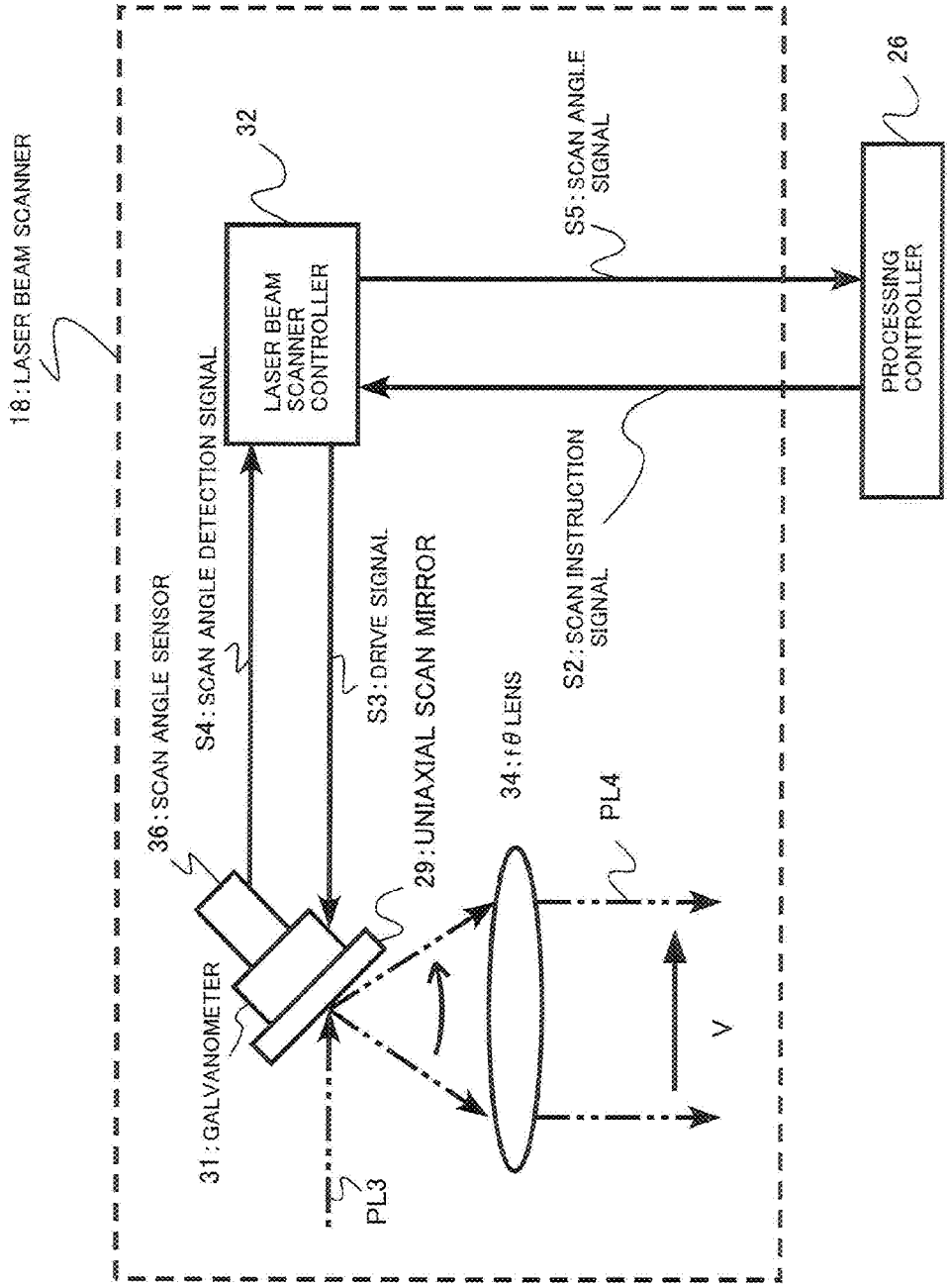
FIG. 21 is a diagram for explaining the laser beam scanner of the pulse laser processing apparatus according to the second embodiment.

The laser beam scanner 19 may be a galvanometer scanner that includes a uniaxial scan mirror, for example. FIG. 21 is a diagram for explaining the laser beam scanner including a galvanometer scanner.

The galvanometer scanner includes a uniaxial scan mirror 29, a galvanometer 31, and a laser beam scanner controller 32. Here, the galvanometer 31 includes a drive mechanism for scan mirror rotations such as servo control through feedbacks from a scan angle sensor 36, for example.

A scan instruction signal S2 synchronized with the clock signal S1 is sent from the processing controller 26. The galvanometer 31 is designed to be driven and controlled by a drive signal S3 sent from the laser beam scanner controller 32 based on the scan instruction signal S2. The galvanometer scanner applies the pulse laser beam PL3 totally reflected from the uniaxial scan mirror 29 in synchronization with the rotational movement (swinging) of the scan mirror as indicated by arrows in FIG. 21.

The laser beam scanner 19 includes the scan angle sensor 36. In the galvanometer scanner, the rotational position of the uniaxial scan mirror 28 is detected by a rotary encoder or the like. The scan angle sensor 36 sends a detected scan angle detection signal S4 to the laser beam scanner controller 32, so that the scan angle detection signal S4 is used for controlling the galvanometer 31. Based on the scan angle detection signal S4, the laser beam scanner controller 32 also transmits a scan angle signal S5 as a scan position signal to the processing controller 26.

The pulse laser beam PL3 reflected from the uniaxial scan mirror 29 passes through a fθ lens 34, and turns into a pulse laser beam PL4 that has a height H=fθ and is applied in a one-dimensional direction in parallel at a constant velocity V, for example. As the irradiation pulse light for fine-processing the surface of the workpiece W held on the XY stage unit 20, the pulse laser beam PL4 is projected onto the workpiece W.

Instead of the galvanometer scanner, a polygon scanner, a piezo scanner, a resonant scanner, or the like may be used as the laser beam scanner 19.

Figure 22:
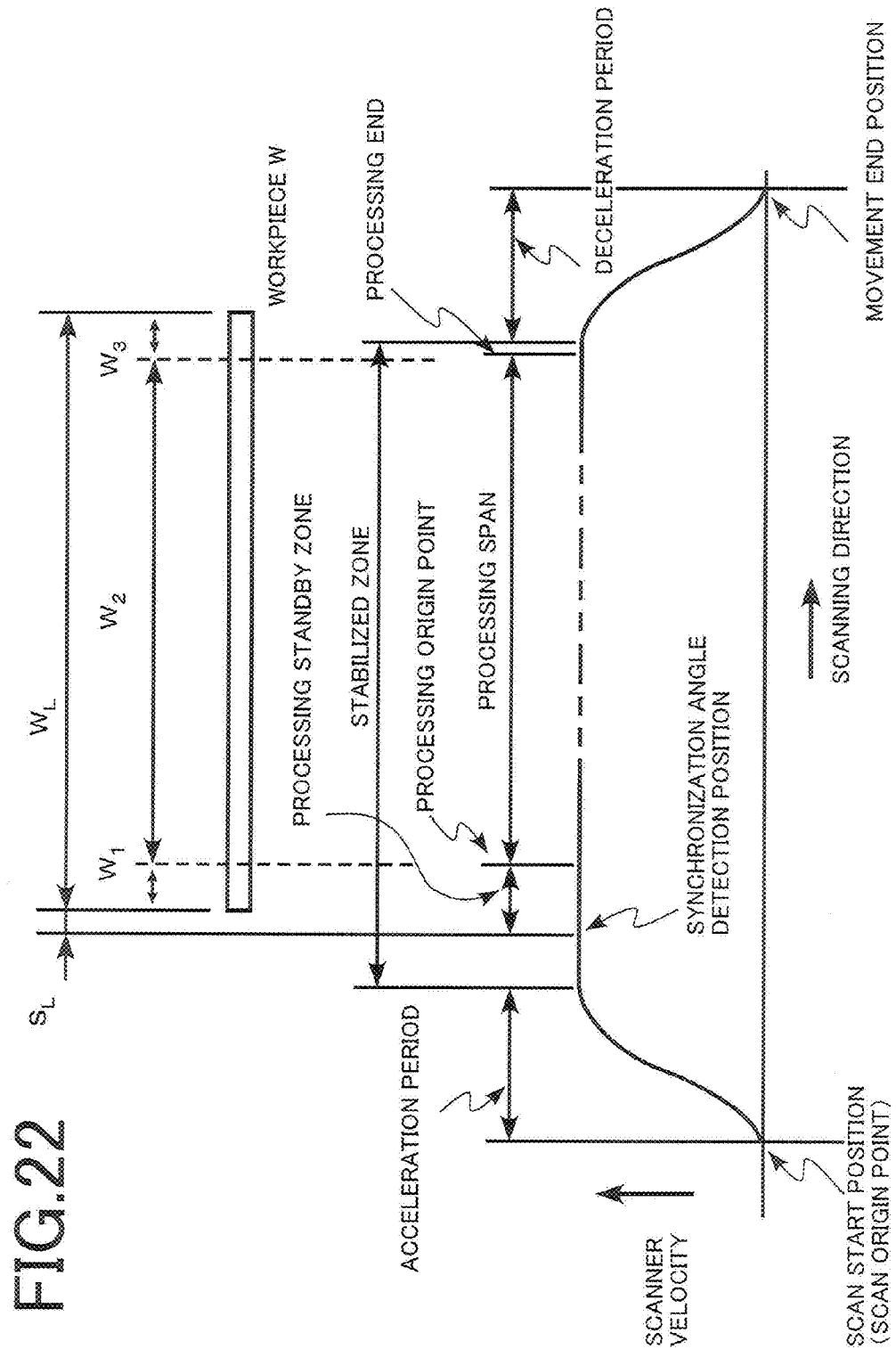
FIG. 22 is a diagram for explaining a scanning operation by the laser beam scanner of the pulse laser processing apparatus according to the second embodiment.

To increase the processing accuracy, it is essential that any one of the above laser beam scanners is designed to perform a control operation to maintain the constant scanning velocity V in the processing span. FIG. 22 is a diagram for explaining the scanning by the laser beam scanner 19 of the pulse laser processing apparatus according to this embodiment. As shown in FIG. 22, the positional range between the scan start position and the scan end position in the scan angle range of the scan mirror includes an acceleration period, a stabilized zone, and a deceleration period. To increase the processing accuracy, it is essential that the apparatus is designed to perform a control operation to maintain the constant scanning velocity V in the stabilized zone that contains the actual processing span.

The XY stage unit 20 can have the workpiece W placed thereon, and includes: an XY stage that can freely move in the XY directions including a direction perpendicular to the one-dimensional direction in which the scanning with the pulse laser beam is performed; a drive mechanism for driving the XY stage; and a position sensor such as a laser interferometer that measures the position of the XY stage. The XY stage can move continuously or stepwise in a wide two-dimensional area or an X-direction and Y-direction distance range of approximately 1 m. The XY stage is designed to have high positioning accuracy and a displacement error on the order of submicrons.

The processing controller 26 is formed by hardware such as a microcomputer (MCU) formed by a semiconductor integrated circuit, a microprocessor (MPU), a digital signal processor (DSP), a semiconductor memory, or a circuit substrate, or by a combination of the hardware and software. The processing by the pulse laser processing apparatus is collectively controlled.

Figure 23:
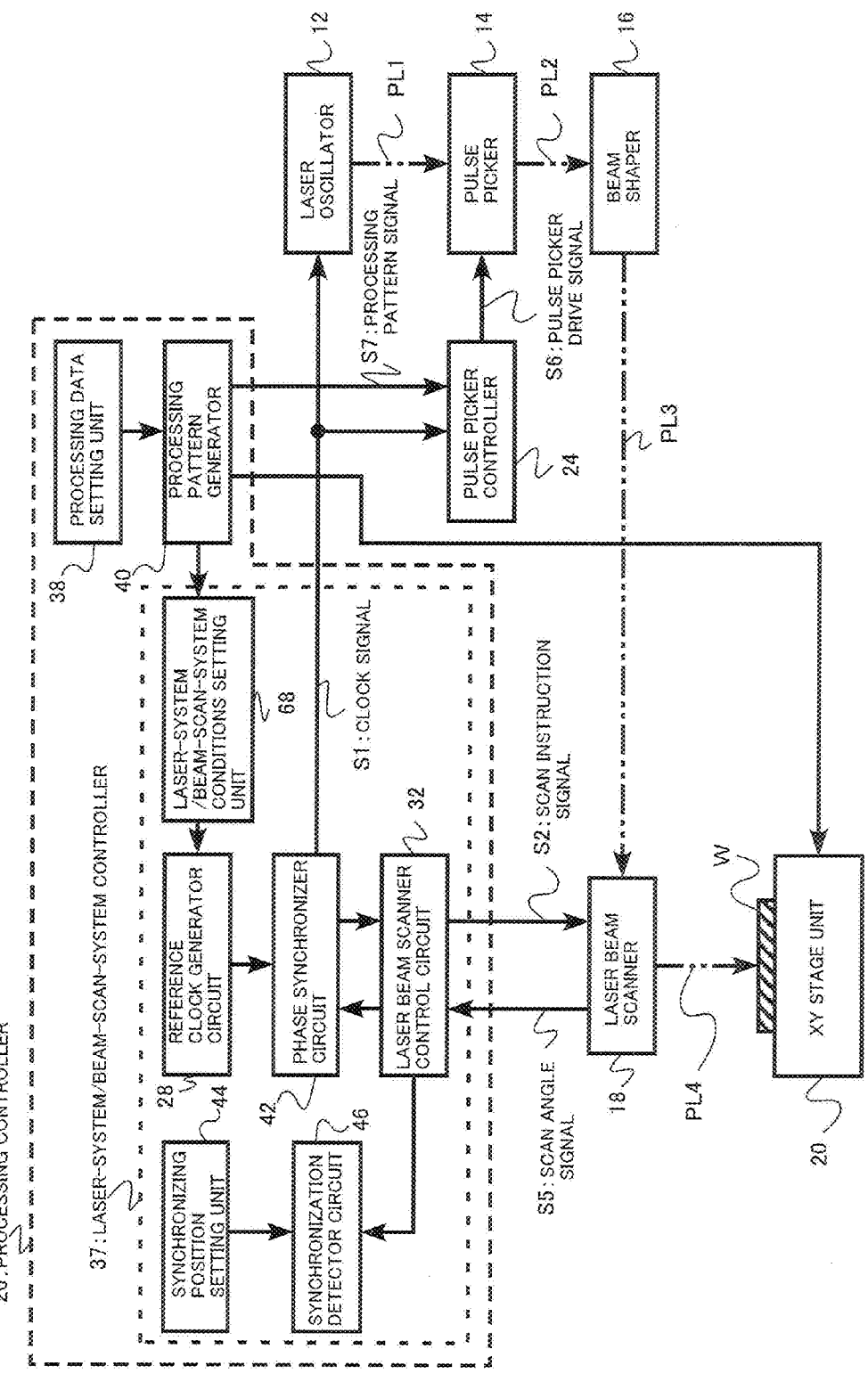
FIG. 23 is a diagram for explaining the processing controller of the pulse laser processing apparatus according to the second embodiment.

FIG. 23 is a diagram for explaining the processing controller 26 of the pulse laser processing apparatus according to this embodiment. The processing controller 26 includes a laser-system/beam-scan-system controller 36, a processing data setting unit 38, and a processing pattern generator 40.

The laser-system/beam-scan-system controller 36 controls the laser system including the laser oscillator 12 and the pulse picker 14, and the beam scan system including the laser beam scanner 19. The laser-system/beam-scan-system controller 36 includes a laser-system/beam-scan-system conditions setting unit 68 that sets conditions for the laser system and the beam scan system, and a reference clock oscillation circuit 28 that generates the clock signal S1 for maintaining the synchronization between the laser system and the beam scan system. To maintain the synchronization between the laser system and the beam scan system, the laser-system/beam-scan-system controller 36 also includes a phase synchronizer circuit 42, the laser beam scanner control circuit 32, a synchronizing position setting unit 44, and a synchronization detector circuit 46.

The processing pattern generator 40 converts processing data that is input from outside to the processing pattern generator 40 into parameter data corresponding to the actual processing. The processing data that is input to the processing data setting unit 40 contains designated three-dimensional shapes, the sizes of the shapes, the number of the shapes, the layout of the shapes, the material of the workpiece, and the size of the workpiece, for example.

Figure 24:
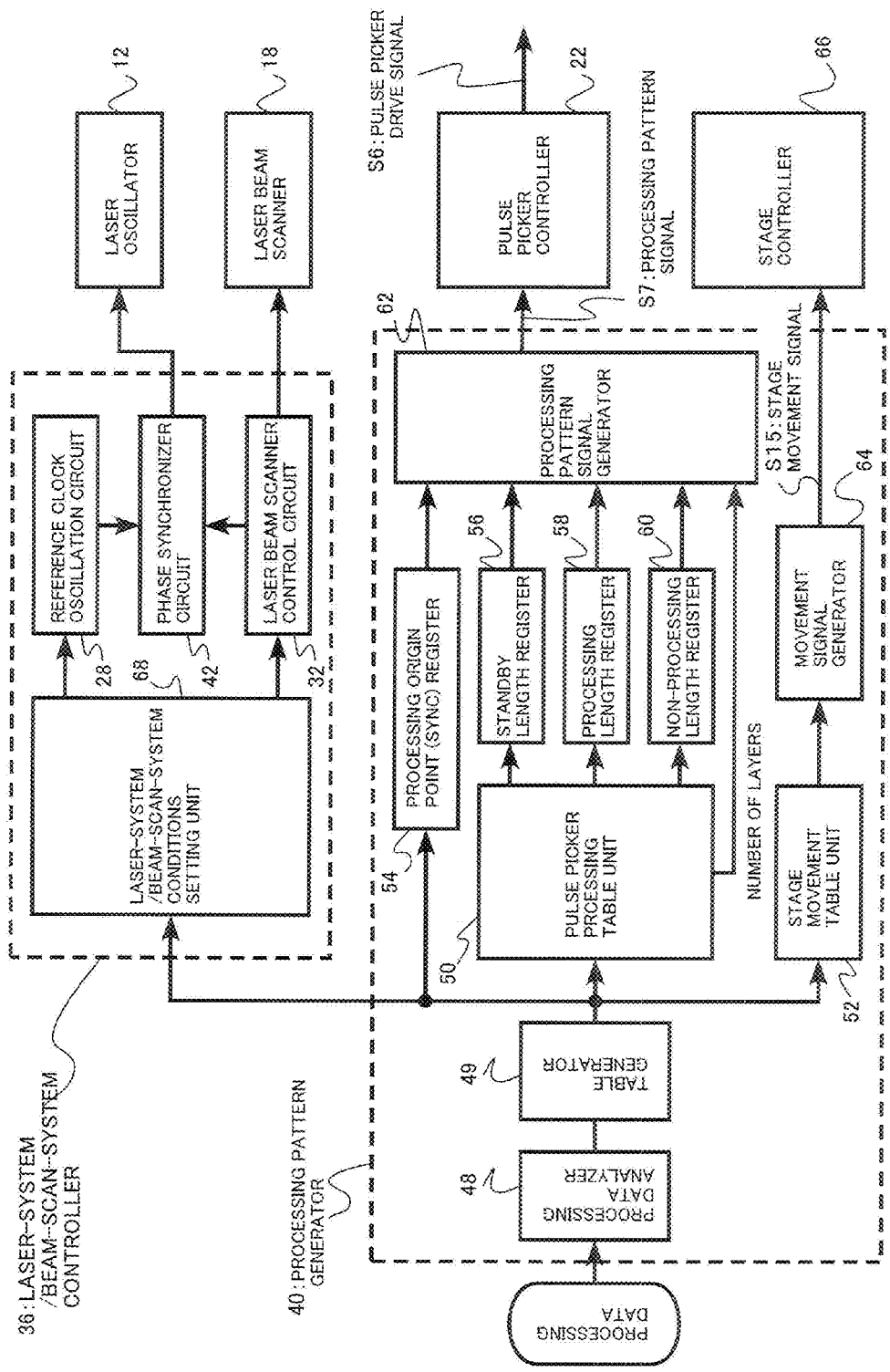
FIG. 24 is a diagram for explaining the processing pattern generator of the pulse laser processing apparatus according to the second embodiment.

FIG. 24 is a diagram for explaining the processing pattern generator 40 of the pulse laser processing apparatus according to this embodiment. The processing pattern generator 40 includes a processing data analyzer 48 that analyzes the processing data that is input to the processing data setting unit 38. The processing pattern generator 40 also includes a table generator 49 that generates a processing table and a stage movement table, based on the analysis made by the processing data analyzer 48. In the processing table, standby lengths, processing lengths, and non-processing lengths in processing patterns are written based on the numbers of light pulses of pulse laser beams. That is, the table generator 49 generates the processing table, based on the processing lengths and non-processing lengths in the processing data and the spot diameters of pulse laser beams. In the stage movement table, moving distances of the XY stage in processing patterns are written.

The processing pattern generator 40 also includes a pulse picker processing table unit 50 that holds the processing table. The processing pattern generator 40 further includes a stage movement table unit 52 that holds the stage movement table. The processing table and the stage movement table may indicate device configurations generated inside the processing pattern generator 40 as described above, or may indicate device configurations generated outside the processing pattern generator 40 and the pulse laser processing apparatus 10.

The processing pattern generator 40 also includes a processing origin (SYNC) register 54 (hereinafter also referred to simply as the processing origin register) to which the information about a processing origin point is input from the pulse picker processing table unit 50. The processing pattern generator 40 further includes a standby length register 56, a processing length register 58, and a non-processing length register 60 to which the information about a standby length, a processing length, and a non-processing length is input from the pulse picker processing table unit 50.

The values held by the processing origin register 54, the standby length register 56, the processing length register 58, and the non-processing length register 60 are input to a processing pattern signal generator 62, and are then sent to the pulse picker controller 24. Based on the data sent from the stage movement table unit 52, a movement signal generator 64 generates a stage movement signal S15, and then outputs the stage movement signal S15 to a stage controller 66.

The data generated by the processing pattern generator 40 is also output to the laser-system/beam-scan-system controller 36, and is used for maintaining the synchronization between the laser system and the beam scan system.

Figure 25:
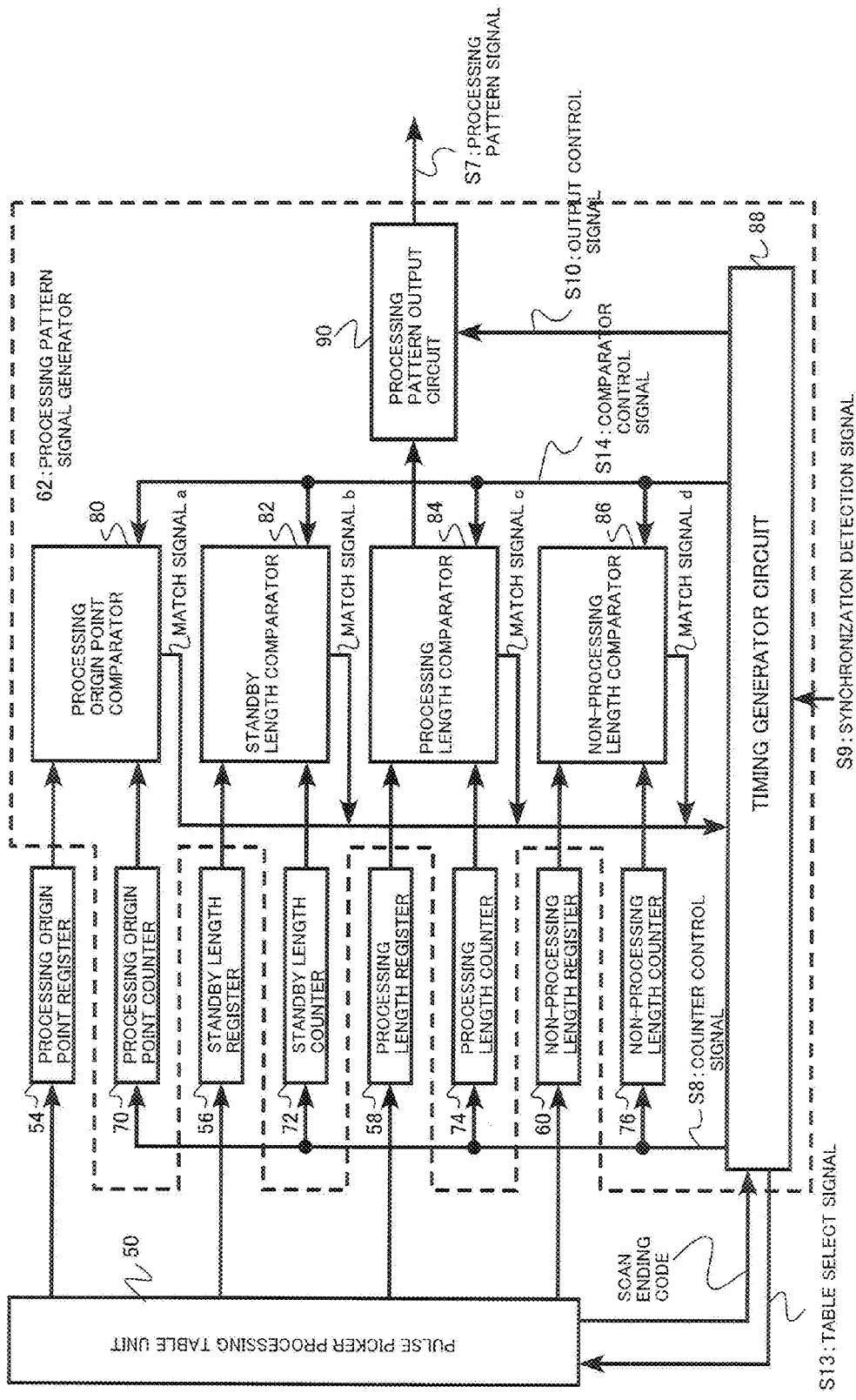
FIG. 25 is a diagram for explaining the processing pattern signal generator of the pulse laser processing apparatus according to the second embodiment.

FIG. 25 is a diagram for explaining the processing pattern signal generator 62 of the pulse laser processing apparatus according to this embodiment. The processing pattern signal generator 62 includes a processing origin counter 70, a standby length counter 72, a processing length counter 74, and a non-processing length counter 76. Those counters are made to start counting by a counter control signal S8 that is output from a timing generator circuit 88.

The processing pattern signal generator 62 also includes a processing origin point comparator 80, a standby length comparator 82, a processing length comparator 84, and a non-processing length comparator 86 that have the functions to compare the values held by the respective registers and respective counters. When the values held by the registers and counters match, those comparators output match signals a through d to the timing generator circuit 88.

Based on a synchronization detection signal S9, the match signals a through d, and a scan ending code that are input, the timing generator circuit 88 outputs an output control signal S10 to a processing pattern output circuit 90.

Based on the output from the processing length comparator 84 and the output control signal S10 supplied from the timing generator circuit 88, the processing pattern output circuit 90 generates a processing pattern signal S7.

Based on repetition frequency input data about the pulse laser beam, the processing controller 26 generates in the reference clock oscillation circuit 28 an oscillator clock (the clock signal) S1 to be supplied to the laser oscillator 12. Based on the oscillator clock S1, the laser oscillator 12 generates the pulse laser beam. That is, the pulse laser beam synchronized with the clock signal S1 is emitted.

When a processing start instruction is issued, the pulse laser beam $PL_1$ is emitted by opening a built-in shutter. When the pulse laser beam $PL_1$ is emitted in this manner, a first pulse does not exist, and a stable output energy is maintained.

Based on the above described two-dimensional processing data, the processing controller 26 also generates the processing pattern signal S7. In accordance, with the processing pattern signal S7, the pulse picker controller 24 supplies a pulse picker drive signal S6 synchronized with the pulse laser beam $PL_1$ by the clock signal S1 to the pulse picker 14. In this manner, the pulse picker 14 switches the pulse laser beam between passing and blocking in synchronization with the clock signal S1.

When the scanning by the laser beam scanner 19 is started, the processing controller 26 generates the scan instruction signal S2 synchronized with the clock signal S1. The laser beam scanner controller 32 for the laser beam scanner 19 receives the scan instruction signal S2, and then performs a drive control operation on the laser beam scanner 19. In this manner, the laser beam scanner 19 applies the pulse laser beam only in a one-dimensional direction in synchronization with the clock signal S1.

Further, based on the scan angle signal S5 as a scan position signal from the laser beam scanner 19, the processing controller 26 determines the movement timing of the XY stage unit 20, and generates a stage movement signal S15 based on the two-dimensional processing data and the movement timing. The scan angle signal S5 is generated from the scan angle detection signal S4 formed by the scan angle sensor 36 detecting the processing end position in which the processing illustrated in FIG. 22 ends or the scan end position in which the scanner operation ends. The XY stage unit 20 moves in accordance with the stage movement signal S15.

Based on the scan position signal from the laser beam scanner 19, the movement of the XY stage is controlled to be in a direction perpendicular to the scanning direction of the laser beam scanner 19, for example. In this manner, the time required for moving on to the next scanning is shortened, and the speed of the laser beam processing is made even higher.

In this embodiment, a correction mechanism preferably corrects the processing origin position for each scanning operation, based on the scan position signal from the laser beam scanner 19. With this correction mechanism, a scan velocity variation among the acceleration periods (see FIG. 22) in respective scanning operations by the laser beam scanner is compensated for, and processing can be performed with even higher precision.

In FIG. 20, the processing controller 26 may control the beam shaper 14. Such a case is particularly effective where the beam shaper 14 spontaneously controls the beam diameter or adjusts the light intensity distribution in the beam cross-section surface.

Next, the principal operations of the pulse laser processing apparatus 10 are described. In a laser processing operation for the workpiece W, the laser oscillator 12 has most of its laser oscillations controlled by a controller installed therein. Accordingly, the laser oscillator 12 autonomously operates. However, the pulse oscillating timing and the like are controlled by the above described reference clock oscillation circuit 28. This aspect is now described, with reference to FIGS. 26A and 26B.

The uniaxial scan mirror 29 of the galvanometer scanner shown as an example of the laser beam scanner 19 in FIG. 21 starts scanning in the scan start position (the scan origin point) illustrated in FIG. 22, in accordance with a scan activation signal. At this point, the laser beam scanner 19 receives an instruction through the scan instruction signal S2 synchronized with rising edges (or falling edges) of the clock signal S1 as shown in FIG. 26A, and the laser beam scanner controller 32 performs a drive control operation on the galvanometer 31. Here, according to XY2-100 protocols, the scan instruction signal S2 complies with an absolute scan angle instruction at 100 kHz (Ts=10 μsec), for example.

FIG. 26A shows an example of the scan instruction signal S2 synchronized with rising edges of the clock signal S1 at the time of scan activation in a case where the pulse laser oscillation frequency is 500 kHz (Tp=2 μsec), the beam diameter of the pulse laser beam is 16 μm, and the scanning velocity V is 4000 mm/sec. Such an operation is performed for each scanning operation with the pulse laser beam.

In the acceleration period shown in FIG. 22, the laser beam scanner controller 32 performs a drive control operation on the galvanometer 31 in accordance with the scan instruction signal S2, so that the scanner speed becomes equal to the stable scanning velocity V in an early stage. It has been empirically confirmed that, at this point, the scan angle repetitive reproducibility of the uniaxial scan mirror 29 under optimum conditions is approximately 10 μrad/p-p in the stabilized zone. This value is translated into the scan position reproducibility of 1 μm/p-p in a case where a fθ lens of 100 mm in focal length is used.

However, the repetitive reproducibility in the acceleration period becomes about 10 times lower over long-time scanning. As a result, a displacement occurs in the processing start position in each scanning operation. Therefore, based on the scan position signal (the scan angle signal S5) from the laser beam scanner 19, the processing origin position in each scanning operation is corrected by the correction mechanism.

For example, in a sufficiently stabilized zone (the scan angle range is empirically about 2.3 to 3.4 degrees where the acceleration period is 1 to 1.5 msec, and a fθ lens of 100 mm in focal length is used) after the acceleration period, a synchronization angle ($\theta$sy) that is set beforehand as shown in FIG. 26B is detected as a detection signal by the scan angle sensor 36. In that case, the difference from the scan instruction signal ($\theta$o: the scan angle in the scan start position) is set as the phase difference ($\theta$i), and the distance to the processing origin point with respect to the scan instruction signal S2 is corrected with the phase difference.

The correction value of the distance to the processing origin point is stored, with the value in the first scanning operation (i=1) being the reference correction value at the time of processing. In every nth scanning operation from the scan start position (i=n), the difference between the first phase difference ($\theta$n) and the phase difference ($\theta$1) is used as the correction value of the distance to the processing origin point with respect to the scan instruction signal in the nth scanning operation compared with the first scanning operation, so that the processing origin position in the nth scanning operation is made equal to the processing origin position in the first scanning operation.

Figure 27:
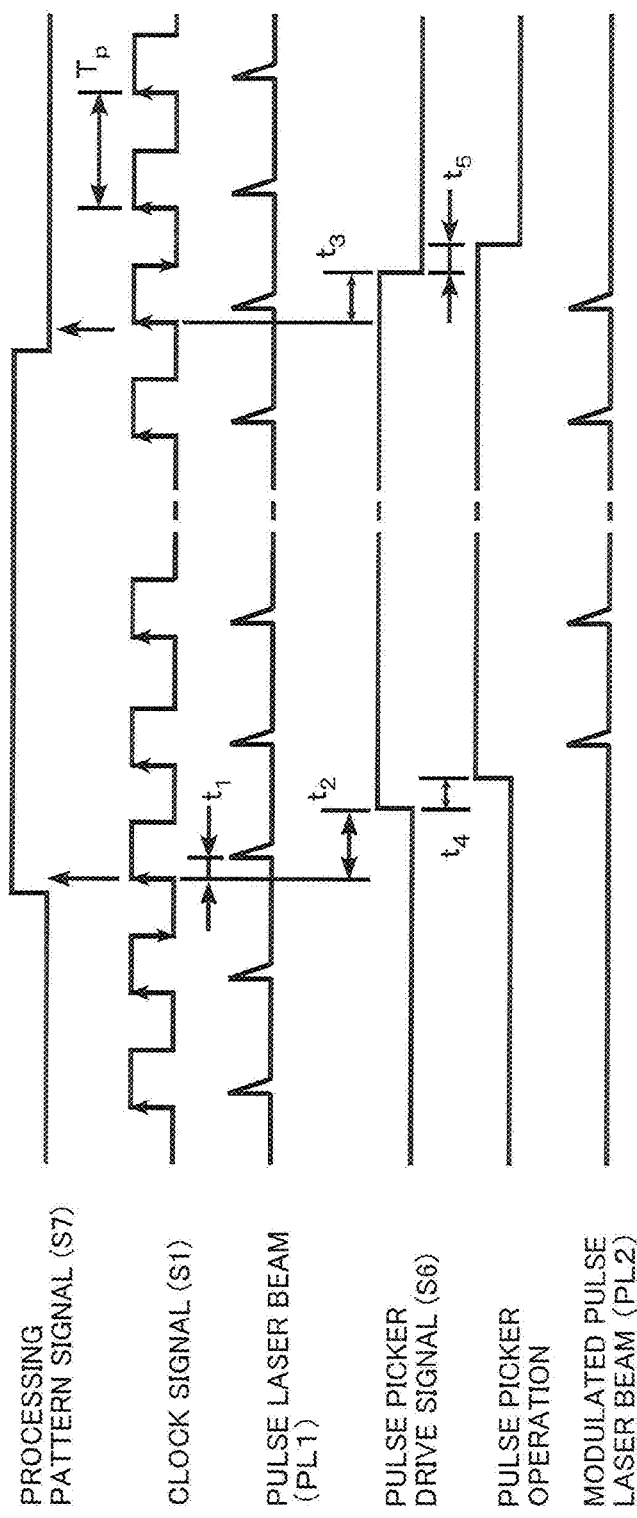
FIG. 27 is a signal waveform chart for explaining timing control performed through a pulse picker operation in the pulse laser processing apparatus according to the second embodiment.

The processing pattern signal S7 shown in FIG. 27 is based on a three-dimensional bitmap, including the data about the distance from the processing origin point. Therefore, when the processing origin positions match in respective scanning operations, the processing start positions of the processing pattern signal S7 also match, and the pulse picker drive signal S6 is also generated at a desired time.

In a case where the laser beam scanner 19 is formed by the galvanometer scanner illustrated in FIG. 21, a scanner clock signal serves as a drive signal sent from the laser beam scanner controller 32, and drives a servo control motor. However, phase shifting might occur in the laser beam scanner 19, due to autonomous operations thereof. Therefore, the passing/blocking of oscillated pulse light is synchronized with scanning operations by a synchronization angle detection signal serving as a scan position signal generated in each repeated scanning operation. In this manner, timing matching is performed, and very stable laser processing can be performed.

It is preferable to control passing and blocking of the pulse laser beam at the pulse picker 14, based on the scan position signal from the laser beam scanner 19. Specifically, the correction mechanism controls the passing and blocking of the pulse laser beam at the pulse picker 14, based on the scan position signal (the scan angle signal S5), for example. That is, the timing of the drive signal of the pulse picker 14 is determined based on the phase difference detected from the scan position signal in the synchronizing position (angle) detection of the rotational position of the scan mirror. In this manner, the processing origin position in each scanning operation with the pulse laser beam is corrected.

Alternatively, the correction mechanism supplies the distance correction value obtained from the phase difference detected from the scan position signal, to each scan instruction signal generated after the scan instruction signal for the laser beam scanner 19 with respect to the scan angle $\theta$o in the scan start position. By doing so, the correction mechanism corrects the processing origin position in each scanning operation with the pulse laser beam.

Through the pulse picker operation, the pulse laser beam is subjected to pulse frequency modulation, and desired modulated pulse light is generated. This aspect is now described, with reference to FIG. 27.

As shown in FIG. 27, the pulse laser beam PL1 having a delay t1 from the clock signal S1 at a frequency Tp is switched between passing and blocking by the pulse picker drive signal S6. For example, the pulse picker drive signal S6 is a pattern signal that samples the processing pattern signal S7 at a rising edge of the clock signal S1, rises time t2 after the rising of one clock of the clock signal S1, and falls time t3 after the rising of the clock a predetermined number of clocks after the one clock. An operation of the pulse picker 14 is then performed in accordance with delay times t4 and t5 based on the pulse picker drive signal S6, and the pulse laser beam PL1 during the operation is extracted as the modulated pulse laser beam PL2. Here, the above delay times t2, t3, t4, and t5 are set in conformity with the pulse picker 14.

In a case where the pulse picker 14 is an acousto-optic modulator (AOM), the inverted pattern signal of the pulse picker drive signal S6 serves as the driver signal for controlling ON/OFF of oscillation at an ultrasonic generation controller. The desired oscillated pulse light is then extracted by the driver signal having the inverted pattern.

Also, as described above, the scan position signal (the scan angle signal S5) from the laser beam scanner 19, or the scan position signal in the processing end position in the rotary position of the scan mirror, designates the movement timing of the XY stage unit 20. If the X-axis direction is the one-dimensional scanning direction of the laser beam scanner 19, the XY stage is moved in a stepwise manner with a predetermined width or in a continuous manner in the Y-axis direction with the above mentioned movement timing. Alternatively, the XY stage is moved in a continuous manner or in a stepwise manner over a predetermined distance in the X-axis direction. In this manner, the movement of the XY stage is controlled in accordance with a predetermined movement pattern.

For example, the modulated pulse laser beam PL2 generated based on the pulse picker operation pattern has pulse light shaped into a desired form by the beam shaper 16. The laser beam scanner 19 then performs the X-axis direction scanning, and the XY stage unit 20 moves the position of the workpiece W in the Y-axis direction. Accordingly, the irradiation pulse light is projected onto the workpiece W in a desired position, and high-precision fine processing is performed on the surface of the workpiece W. The durations of respective pulse picker operations according to the pulse picker operation pattern and the time intervals between the respective operations may vary.

Next, a pulse laser processing method using the above described pulse laser processing apparatus 10 is described. According to this pulse laser processing method, after the metal film is removed, an object to be processed (a substrate to be processed or a workpiece) is placed on a stage, and a clock signal is generated. A pulse laser beam synchronized with the clock signal is emitted, and the pulse laser beam synchronized with the clock signal is applied onto the surface of the workpiece in a one-dimensional direction. After the pulse laser beam is applied in the one-dimensional direction, the stage is moved in a direction perpendicular to the one-dimensional direction, and the pulse laser beam is further applied in the one-dimensional direction in synchronization with the clock signal. When the pulse laser beam is applied in the one-dimensional direction, the pulse laser beam is switched between irradiation and non-irradiation in synchronization with the clock signal, based on the number of light pulses of the pulse laser beam.

FIGS. 26A and 26B are signal waveform charts for explaining timing control performed in the pulse laser processing apparatus according to this embodiment. When the workpiece W placed on the stage is processed, the laser oscillator 12 has most of laser oscillations controlled by a controller installed therein, and autonomously operates. However, the pulse oscillation timing is controlled by the clock signal S1 at the frequency Tp generated by the reference clock oscillation circuit as shown in FIG. 26A, and the pulse laser beam PL1 at the frequency Tp synchronized with the clock signal S1 is emitted.

Based on the scan activation signal S11, the laser beam scanner 19 starts scanning in the scan start position (the scan origin point) shown in FIG. 18. At this point, the laser beam scanner 19 receives an instruction through the scan instruction signal S2 at a frequency Ts that is generated by the processing controller 26 and is synchronized with rising edges (or falling edges) of the clock signal S1 as shown in FIG. 26A. Based on the scan instruction signal S2, the laser beam scanner controller 32 performs a drive control operation on the galvanometer 31.

In this manner, the laser beam scanner 19 applies the pulse laser beam in a one-dimensional direction in synchronization with the clock signal S1. At this point, the pulse laser beam is switched between irradiation and non-irradiation, to form a pattern in the surface of the workpiece W. It should be noted that, according to XY2-100 protocols, the scan instruction signal S2 complies with an absolute scan angle instruction at 100 kHz (Ts=10 μsec), for example, with the reference being the position of the scan angle of "zero degree" of the galvanometer 31.

FIG. 26A shows an example of the scan instruction signal S2 synchronized with rising edges of the clock signal S1 at the time of scan activation in a case where the pulse laser oscillation frequency is 500 kHz (Tp=2 μsec), the beam diameter of the pulse laser beam is 16 μm, and the scanning velocity V is 4000 mm/sec.

After the pulse laser beam is applied in the one-dimensional direction, the stage is moved in a direction perpendicular to the above mentioned one-dimensional direction, and the pulse laser beam is further applied in the one-dimensional direction in synchronization with the clock signal. In this manner, the application of the pulse laser beam in the one-dimensional direction and the moving of the stage in the direction perpendicular to the one-dimensional direction are alternately performed.

Here, the scan angle signal S5 serving as the scan position signal from the laser beam scanner 19 designates the movement timing of the XY stage unit 20. If the X-axis direction is the one-dimensional scanning direction of the laser beam scanner 19, the XY stage is moved in a stepwise manner with a predetermined width or in a continuous manner in the Y-axis direction with the above mentioned movement timing. After that, the pulse laser beam is applied in the X-direction.

In the acceleration period shown in FIG. 22, the laser beam scanner 19 is controlled by the scan instruction signal S2, so that the scanning speed becomes equal to the stable scanning velocity V in an early stage. It is empirically apparent that the scan angle repetitive reproducibility of the uniaxial scan mirror 29 under optimum conditions is approximately 10 μrad/p-p in the stabilized zone. This value is translated into the scan position reproducibility of 1 μm/p-p in a case where a fθ lens of 100 mm in focal length is used.

However, the repetitive reproducibility in the acceleration period becomes about 10 times lower over long-time scanning. As a result, the position of the processing origin point shown in FIG. 22 might vary in each scanning operation. Therefore, in a sufficiently stabilized zone, a synchronization angle (θsy) for achieving synchronization between the oscillation of the pulse laser beam PL1 and the beam scan is set. The scan angle range required for reaching a sufficiently stabilized zone is about 2.3 to 3.4 degrees where the acceleration period is 1 to 1.5 msec, and a fθ lens of 100 mm in focal length is used, for example.

This synchronization angle is detected by the scan angle sensor 36, as shown in FIG. 26B. When the synchronization angle is detected, the phase difference (θi) from the scan instruction signal S2 corresponding to the scan angle $θ_0$ in the scan start position is determined. The distance to the processing origin point with respect to the scan instruction signal S2 is then corrected based on the phase difference $\theta_i$.

The correction value of the distance to the processing origin point is stored, with the value in the first scanning operation (i=1) being the reference correction value at the time of processing. In every nth scanning operation from the scan start position (i=n) to be performed later, the difference between the phase difference ($\theta_n$) and the phase difference ($\theta_1$) is used as the correction value of the distance to the processing origin point with respect to the scan instruction signal S2 in the nth scanning operation compared with the first scanning operation. The obtained distance correction value is then supplied to each scan instruction signal (S2) generated after the scan instruction signal (S2: the absolute scan angle instruction) with respect to the scan angle $\theta_0$ in the scan start position. In this manner, the processing origin position is corrected. Accordingly, even if the scanning velocity of the laser beam scanner 19 varies in the acceleration period, the processing origin position in the nth scanning operation can be made equal to the processing origin position in the first scanning operation.

As described above, after the pulse laser beam is applied in a one-dimensional direction, the stage is moved in a direction perpendicular to the above mentioned one-dimensional direction, and the pulse laser beam is further applied in the one-dimensional direction in synchronization with the clock signal S1. In this manner, the processing origin positions of respective scanning operations become the same, and the processing accuracy becomes higher.

When the pulse laser beam is applied in the one-dimensional direction, the pulse laser beam is switched between irradiation and non-irradiation in synchronization with the clock signal S1, based on the number of light pulses of the pulse laser beam. Irradiation and non-irradiation with the pulse laser beam are controlled by the pulse picker 14.

The parameters shown in FIG. 18 are:
$S_L$: distance from the synchronization angle detecting position to the workpiece
$W_L$: length of the workpiece
$W_1$: distance from an end of the workpiece to the processing origin point
$W_2$: processing span
$W_3$: distance from the processing end to the other end of the workpiece Here, the following relationship is established:

processing origin point=synchronization angle detecting position+$S_L$+$W_1$

Since the workpiece is placed in a fixed position on the stage, $S_L$ also represents a fixed distance. Further, the processing origin point on the workpiece (hereinafter also referred to as the processing origin point (SYNC)) having the synchronization angle detecting position as the reference is also expressed as:

processing origin point (SYNC)=$S_L$+$W_1$

The processing origin point (SYNC) is managed by performing the above described correction, and processing is always started from the same position in respective scanning operations. It should be noted that, as shown in FIG. 18, actual processing is performed within the processing span ($W_2$).

For example, in a case where scanning is performed with a beam spot diameter D (μm) and a beam frequency F (kHz), the processing velocity V (m/sec) is expressed as:

$V=D\times10^{-6}\times F\times10^{3}/n$ where the beam irradiation position is moved 1/n of the spot diameter at a time.

In a case where processing is performed by controlling light pulses with the pulse picker 14, the pulse picker drive signal S6 generated by the pulse picker 14 can define the area in which processing is actually performed, and define the repetitive processing pitch from the non-processing length. Where $L_1$ represents the processing length, and the $L_2$ represents the non-processing length, the processing length register can be set as follows, based on the number of light pulses of the pulse laser beam:

number of processing pulses=$(L_1/(D/n))-1$

The non-processing length register can be set as follows:

number of non-processing pulses=$(L_2/(D/n))+1$

Also, the length from the processing origin point (SYNC) to the position in which actual processing is started is defined as the standby length, so that the start position for each processed shape is set. Where $L_w$ represents the standby length, the processing origin point (SYNC) register can be set as follows:

number of processing origin point (SYNC) light pulses=$(S_L+W_1)/(D/n)$

The standby length register can be set as follows:

number of standby length light pulses=$L_w/(D/n)$

It should be noted that the values set in the respective registers for the processing length, the non-processing length, the standby length, and the processing origin point (SYNC) are the numbers of light pulses corresponding to the respective lengths. The numbers of light pulses are the values to which the number of correcting light pulses determined beforehand based on the beam profile to be used is added.

The above register set values are managed with the number of light pulses to be applied. The processing standby zone after each synchronization angle detection is also managed with the number of light pulses. By managing the pulse picker 14 with the number of light pulses, the synchronization between the reference clock signal S1 and the pulse picker 14 can be easily maintained, and stable repetitiveness is secured. By maintaining the synchronization between the clock signal S1 and the pulse picker 14, high-precision laser processing can be readily realized.

FIG. 27 is a signal waveform chart for explaining timing control performed through a pulse picker operation in the pulse laser processing apparatus according to this embodiment. The processing pattern signal S7 that is generated from processing data and is managed with the number of light pulses is output from the processing pattern output circuit 62 of the processing pattern signal generator 40.

As shown in FIG. 27, the pulse laser beam (PL1) having a delay $t_1$ from the clock signal S1 at a frequency Tp is switched between passing and blocking, based on the pulse picker drive signal S6. It should be noted that the synchronization between the scanning by the laser beam scanner 19 and the passing and blocking of the pulse laser beam is achieved by synchronizing the timing to generate the scan instruction signal (S2) with the clock signal (S1).

For example, the pulse picker drive signal S6 samples the processing pattern signal S7 at a rising edge of the clock signal S1. The pulse picker drive signal S6 then rises time $t_2$ after the rising of one clock of the clock signal S1. After the number of clocks equivalent to a predetermined number of pulses, the processing pattern signal S7 in an inactive state is sampled at a rising edge of the clock signal S1, and the pulse picker drive signal S6 falls with a delay time $t_3$.

An operation of the pulse picker 14 is then performed in accordance with delay times $t_4$ and $t_5$ based on the pulse picker drive signal S6. Through the operation of the pulse picker 14, the pulse laser beam (PL1) during the operation is extracted as the modulated pulse laser beam (PL2).

The embodiments of the present invention have been described so far through specific examples. However, the present invention is not limited to those specific examples. In the embodiments, the aspects not particularly essential in the description of dicing methods and dicing apparatuses and the like according to the invention have not been described. However, any components for dicing methods and dicing apparatuses and the like may be selected and used as needed.

Also, all dicing methods that include the components according to the invention and can be designed and modified by those skilled in the art should be included in the scope of the invention. The scope of the invention is defined by the claims and equivalents thereof.

For example, the substrate to be processed is a sapphire substrate having LEDs formed therein in the above described embodiments. A substrate such as a sapphire substrate that is hard, is poor in cleavability, and is difficult to dice is useful in the present invention. However, the substrate to be processed may be a semiconductor material substrate such as a SiC (silicon carbide) substrate, a piezoelectric material substrate, a glass substrate, or the like.

Also, in the above embodiments, the number of irradiating light pulses (P1) is 2, and the number of non-irradiating light pulses (P2) is 1. However, the values of P1 and P2 may be any values for setting optimum conditions. In the above embodiments, irradiation and non-irradiation with the irradiating light pulse are repeated at the pitch equivalent to the spot diameter. However, the pitch of irradiation and non-irradiation may be changed by changing the pulse frequency or the stage moving velocity, so as to set optimum conditions. For example, the pitch of irradiation and non-irradiation may be equivalent to 1/n of the spot diameter or may be n times greater than the spot diameter.

Particularly, in a case where the substrate to be processed is a sapphire substrate, the irradiation energy is set at 30 to 150 mW or lower, and the pulse laser beam is allowed to pass in every 1 to 4 light pulses and is blocked in every 1 to 4 light pulses. With this arrangement, the pitch of irradiation becomes 1 to 6 μm. Accordingly, cracks that excel in continuity and linearity can be formed in the surface of the substrate to be processed.

The dicing processing pattern may be changed into various dicing processing patterns by providing two or more irradiated region registers and two or more non-irradiated region registers, or changing the values set in the irradiated region registers and the non-irradiated region registers in real time to desired values whenever needed.

Also, in the above described embodiments, the laser dicing apparatus includes a processing table unit that stores a processing table in which dicing processing data is described as the numbers of light pulses in pulse laser beams. However, such a processing table unit may not be provided, as long as the apparatus includes a structure that controls passing and blocking of a pulse laser beam with a pulse picker on a light pulse basis.

Also, in the above described embodiments, the devices are high-intensity LEDs each having a reflection film such as an Au film. However, it is also possible to employ other devices such as power transistors each having a metal film as an electrode material such as a gold, silver, or aluminum film formed on the bottom surface thereof.

What is claimed is:

1. A method of dicing a substrate to be processed, a plurality of devices being formed in the substrate, a metal film being formed on one surface of the substrate, the method comprising:
    placing the substrate onto a first stage;
    forming a groove portion in the metal film by removing the metal film through a metal processing operation with a diamond tool;
    placing the substrate onto a second stage;
    generating a clock signal;
    emitting a pulse laser beam synchronized with the clock signal to the groove portion formed in the metal film;
    moving the substrate and the pulse laser beam relative to each other;
    switching the pulse laser beam between irradiation and non-irradiation of the substrate on a light pulse basis by controlling passing and blocking of the pulse laser beam with a pulse picker in synchronization with the clock signal; and
    forming cracks in the substrate, the cracks reaching a surface of the substrate.

2. The method according to claim 1, wherein the cracks are formed in series in the surface of the substrate, by controlling irradiation energy of the pulse laser beam, a processing point depth of the pulse laser beam, and lengths of regions irradiated and regions non-irradiated with the pulse laser beam.

3. The method according to claim 1, wherein the cracks are linearly formed in the surface of the substrate.

4. The method according to claim 1, wherein, after the cracks are formed, the substrate is diced with an external force.

5. The method according to claim 1, wherein the metal processing operation is performed by one of a planar processing technique and a flycut processing technique.

6. The method according to claim 1, wherein, in the metal processing operation, cutting is performed on the surface of the substrate.

7. The method according to claim 1, wherein a position of the substrate and an operation start position of the pulse picker are synchronized with each other.

8. The method according to claim 7, wherein the stage is moved in synchronization with the clock signal, to move the substrate and the pulse laser beam relative to each other.

9. The method according to claim 1, wherein the substrate is a sapphire substrate.

10. A method of dicing a substrate to be processed, a plurality of devices being formed in the substrate, a metal film being formed on one surface of the substrate, the method comprising:
    placing the substrate onto a first stage;
    removing the metal film through a metal processing operation with a diamond tool and forming a groove portion in the metal film;
    placing the substrate onto a second stage;
    generating a clock signal;
    emitting a pulse laser beam synchronized with the clock signal to the groove portion formed in the metal film;
    applying the pulse laser beam to a surface of the substrate in a one-dimensional direction with a pulse picker and a laser beam scanner, while switching the pulse laser beam between passing and blocking in synchronization with the clock signal;
    after applying the pulse laser beam in the one-dimensional direction, moving the stage in a direction perpendicular to the one-dimensional direction;

further applying the pulse laser beam in the one-dimensional direction in synchronization with the clock signal; and forming cracks in the substrate, the cracks reaching a surface of the substrate to be processed, a processing origin position in each scanning operation being corrected by controlling the passing and blocking of the pulse laser beam at the pulse picker, based on a scan position signal supplied from the laser beam scanner.

11. The method according to claim 10, wherein movement of the second stage in the direction perpendicular to the one-dimensional direction is controlled, based on the scan position signal from the laser beam scanner.

12. The method according to claim 10, wherein the cracks are formed in series in the surface of the substrate, by controlling irradiation energy of the pulse laser beam, a processing point depth of the pulse laser beam, and lengths of regions irradiated and regions non-irradiated with the pulse laser beam.

13. The method according to claim 10, wherein the cracks are linearly formed in the surface of the substrate.

14. The method according to claim 10, wherein, after the cracks are formed, the substrate is diced with an external force.

15. The method according to claim 10, wherein the metal processing operation is performed by one of a planar processing technique and a flycut processing technique.

16. The method according to claim 10, wherein, in the metal processing operation, cutting is performed on the surface of the substrate.

17. The method according to claim 10, wherein a position of the substrate to be processed and an operation start position of the pulse picker are synchronized with each other.

18. The method according to claim 17, wherein the stage is moved in synchronization with the clock signal, to move the substrate to be processed and the pulse laser beam relative to each other.

19. The method according to claim 10, wherein the substrate is a sapphire substrate.

* * * * *